United States Patent
Masuda et al.

(10) Patent No.: US 12,157,055 B2
(45) Date of Patent: Dec. 3, 2024

(54) NON-TRANSITORY COMPUTER-READABLE STORAGE MEDIUM HAVING STORED THEREIN GAME PROGRAM, INFORMATION PROCESSING APPARATUS, INFORMATION PROCESSING SYSTEM, AND INFORMATION PROCESSING METHOD

(71) Applicants: Nintendo Co., Ltd., Kyoto (JP); The Pokémon Company, Tokyo (JP)

(72) Inventors: Junichi Masuda, Tokyo (JP); Yuichi Ueda, Tokyo (JP)

(73) Assignees: NINTENDO CO., LTD., Kyoto (JP); THE POKÉMON COMPANY, Tokyo (JP)

( * ) Notice: Subject to any disclaimer, the term of this patent is extended or adjusted under 35 U.S.C. 154(b) by 219 days.

(21) Appl. No.: 17/882,637

(22) Filed: Aug. 8, 2022

(65) Prior Publication Data
US 2023/0055446 A1 Feb. 23, 2023

(30) Foreign Application Priority Data
Aug. 17, 2021 (JP) .................. 2021-132782

(51) Int. Cl.
*A63F 13/537* (2014.01)
(52) U.S. Cl.
CPC .................. *A63F 13/537* (2014.09)
(58) Field of Classification Search
CPC .... A63F 13/537; A63F 2300/65; A63F 13/45; A63F 13/55
See application file for complete search history.

(56) References Cited

U.S. PATENT DOCUMENTS

| | | | | |
|---|---|---|---|---|
| 6,251,010 | B1* | 6/2001 | Tajiri | A63F 13/5378 463/43 |
| 6,761,638 | B1* | 7/2004 | Narita | A63F 13/332 463/43 |
| 2014/0357339 | A1* | 12/2014 | Urushihara | G07F 17/329 463/17 |
| 2015/0080073 | A1* | 3/2015 | Naoi | A63F 13/2145 463/9 |
| 2015/0336003 | A1* | 11/2015 | Tezuka | A63F 13/58 463/17 |
| 2016/0144276 | A1* | 5/2016 | Ukai | A63F 13/30 463/31 |

(Continued)

OTHER PUBLICATIONS

Margie B, Drawn: The Painted Tower™ Walkthrough, BigFishGames. com, 2009, p. 1, at https://www.bigfishgames.com/blog/walkthroughs/drawn-the-painted-tower.html (last visited May 8, 2024). (Year: 2009).*

(Continued)

*Primary Examiner* — Steve Rowland
(74) *Attorney, Agent, or Firm* — Nixon & Vanderhye, PC

(57) ABSTRACT

An example of an information processing system sets a room in a virtual space based on an operation input provided by a player and places an item object in the room. If an item object is placed in a room by the player, the information processing system increases the appearance rate of a character of a type relating to the placed item object in accordance with the type of the placed item object and causes a character to appear in the virtual space based on the increased appearance rate.

32 Claims, 16 Drawing Sheets

(56) References Cited

U.S. PATENT DOCUMENTS

2016/0271499 A1* 9/2016 Higo .................... A63F 13/798
2016/0279522 A1* 9/2016 de Plater ................ A63F 13/67

OTHER PUBLICATIONS

"Pokémon Diamond Pokémon Pearl", Scenario Clear Book, Mainichi Communications Inc, Oct. 10, 2006, pp. 32-33 (6 pages with its partial English translation).
Sep. 22, 2023 Office Action issued in Japanese Patent Application No. 2021-132782, pp. 1-5 [machine translation included].
[Pokémon GO] Summary of the effectiveness and specifications of a specific Luer module (Ice Luer/Herbal Luer/Magnet Luer/Rainy Luer), Pokemapi [online], Jul. 20, 2021, [Search date: Sep. 8, 2023], https://pokemongo-get.com/pokego02621/, in particular, refer to "a list of the kinds and effects of the lure module", "Pokémon to attract", "Pokémon that can evolve", "a method of use of a lure module", and "an appearance when a special luer module is used", pp. 1-9.
Encount, Pokémon Wiki [online], Jun. 14, 2020, [Search date: Sep. 8, 2023], https://wiki.xn-rcktega2e.com/w/index.php?title=%E3%82%A8%E3%83%B3%E3%82%AB%E3%82%A6%E3%83%B3%E3%83%88&oldid=456319, in particular, refer to "Overview"and "change in the encount rate", pp. 1-3.
Secret base, Pokemon Wiki [online], May 23, 2020, [Search date: Sep. 8, 2023], https://wiki.xn--rckteqa2e.com/w/index.php?title=%E3%81%B2%E3%81%BP%E3%81%A4%E3%81%8D%E3%81%A1&oldid=452835, in particular, refer to "Third Generation"and "Fourth Generation," pp. 1-4.

\* cited by examiner

| CHARACTER TYPE | CHARACTER NAME | APPEARANCE PROBABILITY p |
|---|---|---|
| A | A1 | 10% |
| | A2 | 10% |
| | ⋮ | ⋮ |
| | An | 1% |
| B | B1 | 10% |
| | B2 | 10% |
| | ⋮ | ⋮ |
| | Bm | 0.5% |
| ⋮ | | |

FIG. 14

| NUMBER OF PLACEMENT REGIONS | SELECTION RATE OF MAXIMUM NUMBER OF APPEARANCES |
|---|---|
| 0 (NORMAL) | INITIAL VALUE (50%) |
| 1-10 | INITIAL VALUE +5% |
| 11-20 | INITIAL VALUE +10% |
| 21-30 | INITIAL VALUE +15% |
| 31-40 | INITIAL VALUE +20% |
| 41-50 | INITIAL VALUE +25% |
| ⋮ | ⋮ |

FIG. 15

| NUMBER OF PLACEMENT REGIONS OF ITEM OF TYPE A | INCREASE/DECREASE AMOUNT OF APPEARANCE RATE WITH RESPECT TO EACH CHARACTER TYPE | | | |
| --- | --- | --- | --- | --- |
| | TYPE A | TYPE B | TYPE C | ‥ |
| 0 (NORMAL) | 0 (INITIAL VALUE) | 0 (INITIAL VALUE) | 0 (INITIAL VALUE) | ‥ |
| 1-10 | +5% | -2% | -1% | ‥ |
| 11-20 | +10% | -4% | -2% | ‥ |
| 21-30 | +15% | -6% | -3% | ‥ |
| 31-40 | +20% | -8% | -4% | ‥ |
| ⋮ | ⋮ | ⋮ | ⋮ | ‥ |

FIG. 16

| NUMBER OF PLACEMENT REGIONS OF ITEM OF TYPE B | INCREASE/DECREASE AMOUNT OF APPEARANCE RATE WITH RESPECT TO EACH CHARACTER TYPE | | | |
|---|---|---|---|---|
| | TYPE A | TYPE B | TYPE C | ·· |
| 0 (NORMAL) | 0 (INITIAL VALUE) | 0 (INITIAL VALUE) | 0 (INITIAL VALUE) | ·· |
| 1-10 | -2% | +5% | -1% | ·· |
| 11-20 | -4% | +10% | -2% | ·· |
| 21-30 | -6% | +15% | -3% | ·· |
| 31-40 | -8% | +20% | -4% | ·· |
| ⋮ | ⋮ | ⋮ | ⋮ | ·· |

NON-TRANSITORY COMPUTER-READABLE STORAGE MEDIUM HAVING STORED THEREIN GAME PROGRAM, INFORMATION PROCESSING APPARATUS, INFORMATION PROCESSING SYSTEM, AND INFORMATION PROCESSING METHOD

CROSS-REFERENCE TO RELATED APPLICATION

This application claims priority to Japanese Patent Application No. 2021-132782, filed on Aug. 17, 2021, the entire contents of which are incorporated herein by reference.

FIELD

An exemplary embodiment relates to a non-transitory computer-readable storage medium having stored therein a game program, an information processing apparatus, an information processing system, and an information processing method that are capable of causing a character to appear.

BACKGROUND AND SUMMARY

Conventionally, there is a game where a character is caused to appear based on a preset appearance probability during the game.

In such a conventional game, there is little room for a player to intervene in the set appearance probability.

Therefore, it is an object of an exemplary embodiment to provide a non-transitory computer-readable storage medium having stored therein a game program, an information processing apparatus, an information processing system, and an information processing method that, in a game where a character is caused to appear, enable a player to influence the appearance probability of the character.

To achieve the above object, the exemplary embodiment employs the following configurations.

A game program according to the exemplary embodiment causes a computer of an information processing apparatus to: perform an appearance process for causing at least any one of a plurality of characters different from a player character to appear based on a preset appearance probability in a virtual space; place an item object based on an operation input; and change the appearance probability in the appearance process based on a type of the placed item object.

Based on the above, it is possible to place a predetermined item object based on an operation input provided by a player, change a preset appearance probability based on the type of the placed item object, and cause a character to appear based on the Changed appearance probability. Consequently, for example, the player can make a desired character likely to appear.

Further, a game program according to the exemplary embodiment causes a computer of an information processing apparatus to: move a player character based on an operation input in a virtual space; in accordance with the movement of the player character, perform an appearance process for causing at least any one of a plurality of characters different from the player character to appear based on a preset appearance probability in a virtual space; place a predetermined item object based on an operation input; and change the appearance probability in the appearance process based on a type of the placed item object.

Based on the above, on the premise that a character is caused to appear based on a preset appearance probability in accordance with the movement of a player character, it is possible to place an item object based on an operation input provided by a player, change the preset appearance probability based on the type of the placed item object, and cause the character to appear based on the changed appearance probability, Consequently, for example, the player can make a desired character likely to appear.

Further, the item objects may be classified into a plurality of types. The plurality of characters may be classified into a plurality of types. The game program may cause the computer to: place the item object of any type of the item objects of the plurality of types based on the operation input; and change the appearance probability so that any of the plurality of characters of a type relating to the type of the placed item object is likely to appear.

Based on the above, it is possible to make a character of a type relating to the type of the placed item object likely to appear. Thus, the player can make a desired character likely to appear.

Further, the game program may cause the computer to place the item object at a position specified in the virtual space based on the operation input.

Based on the above, it is possible to place an item object at a position specified by the player.

Further, the game program may further cause the computer to generate a room that can be entered from a position specified in the virtual space based on an operation input. The game program may further cause the computer to place the item object at a position specified in the room based on an operation input.

Based on the above; the player can generate a room in a virtual space and place an item object in the generated room.

Further, the item object may have a size, and a plurality of the item objects may be able to be placed in the room. The game program may cause the computer to change the appearance probability in accordance with a size of a region where the item object is placed in the room.

Based on the above, for example, the larger the region where the item object is placed is, the more increased or decreased the appearance probability of a character can be.

Further, the game program may cause the computer to change the appearance probability in the appearance process in a range in the virtual space including the position from which the room can be entered.

Based on the above, it is possible to change the appearance probability of a character in a predetermined range including the position of the room generated by the player.

Further, the game program may further cause the computer to: communicate with another information processing apparatus; acquire information regarding the item object placed by another player; and change the appearance probability further based on the information regarding the item object placed by the other player.

Based on the above, it is possible to receive information regarding an item object placed by another player from another information processing apparatus and change the appearance probability of a character further based on the item object placed by the other player.

Another exemplary embodiment may be an information processing apparatus that executes the above program, or may be an information processing system, or may be an information processing method performed by an information processing system.

According to the exemplary embodiment, a player places a predetermined item object and thereby can change the preset appearance probability of a character.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 14 is an example non-limiting diagram showing an example of a change in the selection rate of the maximum number of appearances relating to the number of placement regions of an item object;

FIG. 15 is an example non-limiting diagram showing an example of the increase/decrease amount of the appearance rate with respect to each character type relating to the number of placement regions of an item object of a type A;

FIG. 16 is an example non-limiting diagram showing an example of the increase/decrease amount of the appearance rate with respect to each character type relating to the number of placement regions of an item object of a type B;

DETAILED DESCRIPTION OF NON-LIMITING EXAMPLE EMBODIMENTS (System Configuration)

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by, attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
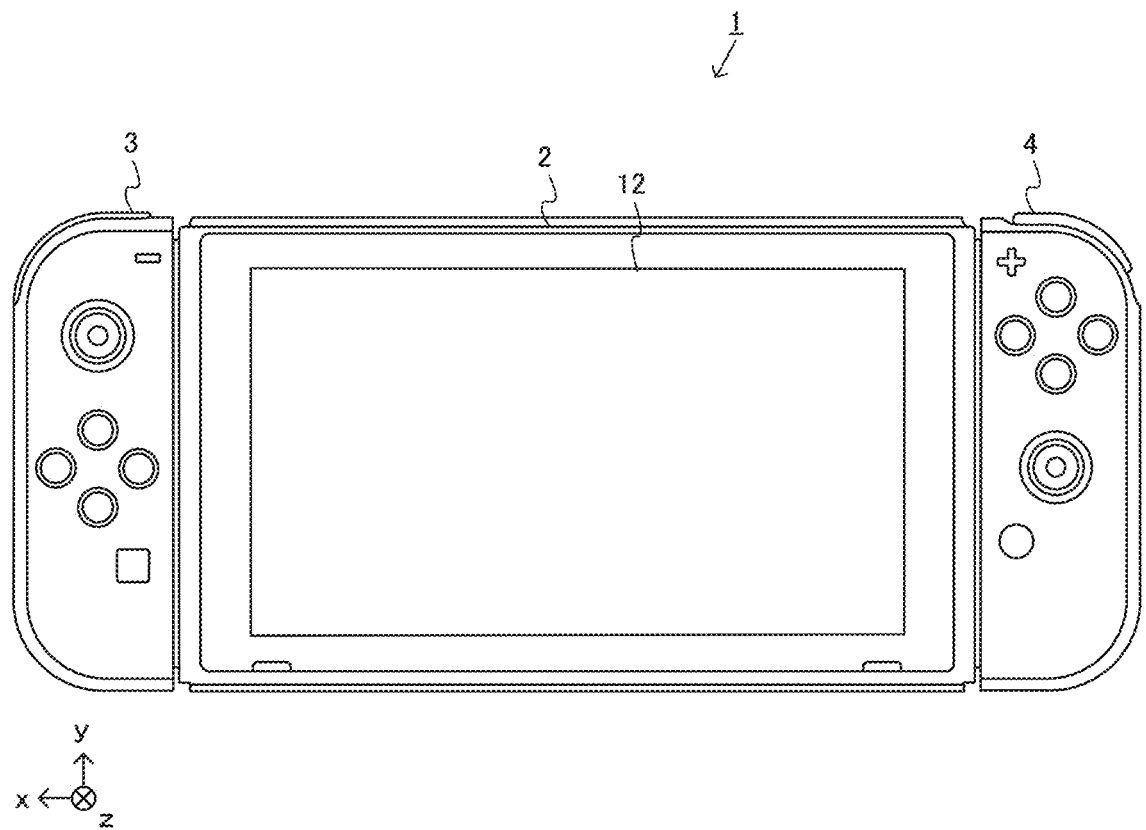
FIG. 1 is an illustrative non-limiting diagram showing the state where a left controller 3 and a right controller 4 are attached to a main body apparatus 2.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body, apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
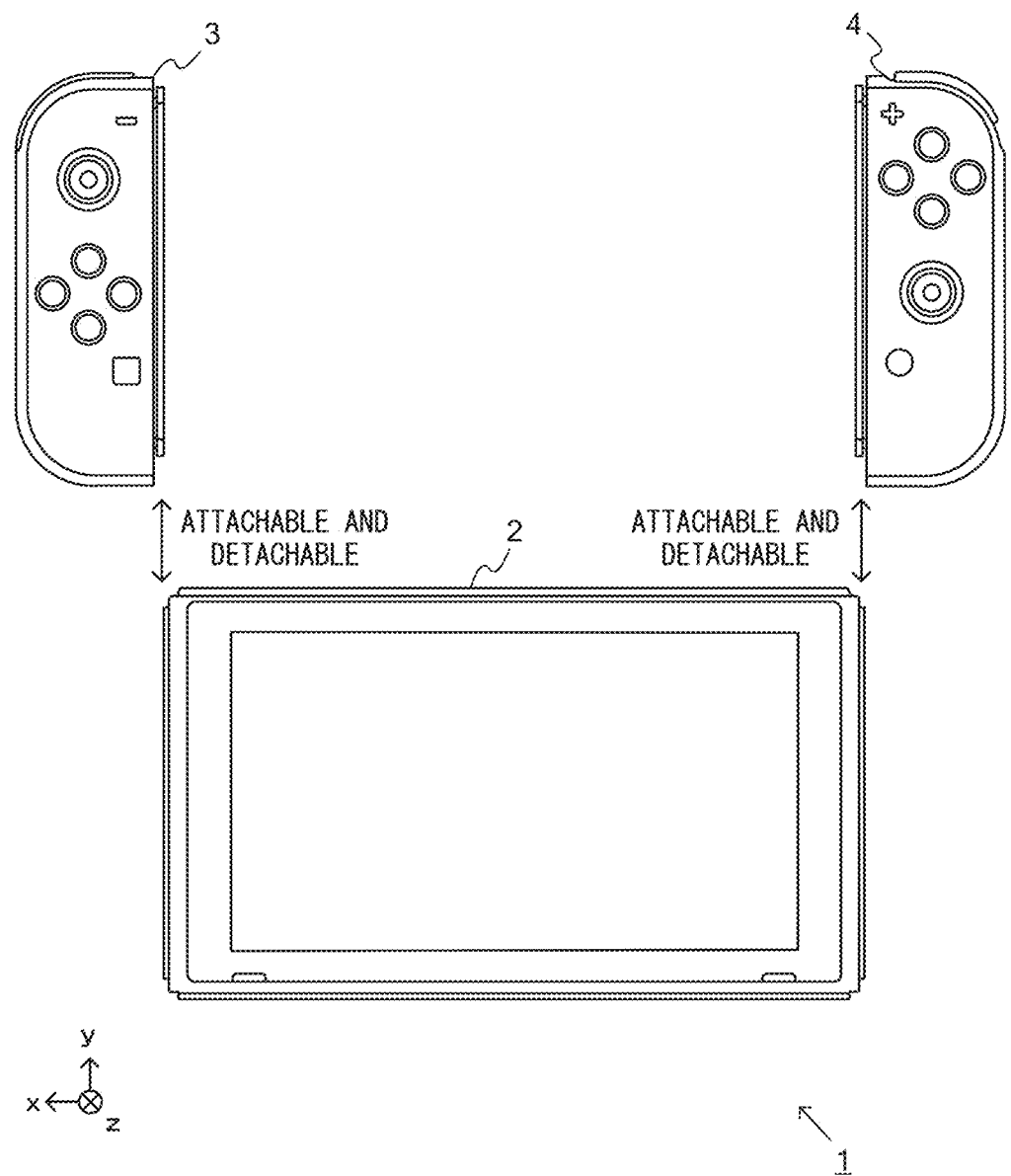
FIG. 2 is an illustrative non limiting diagram showing an example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
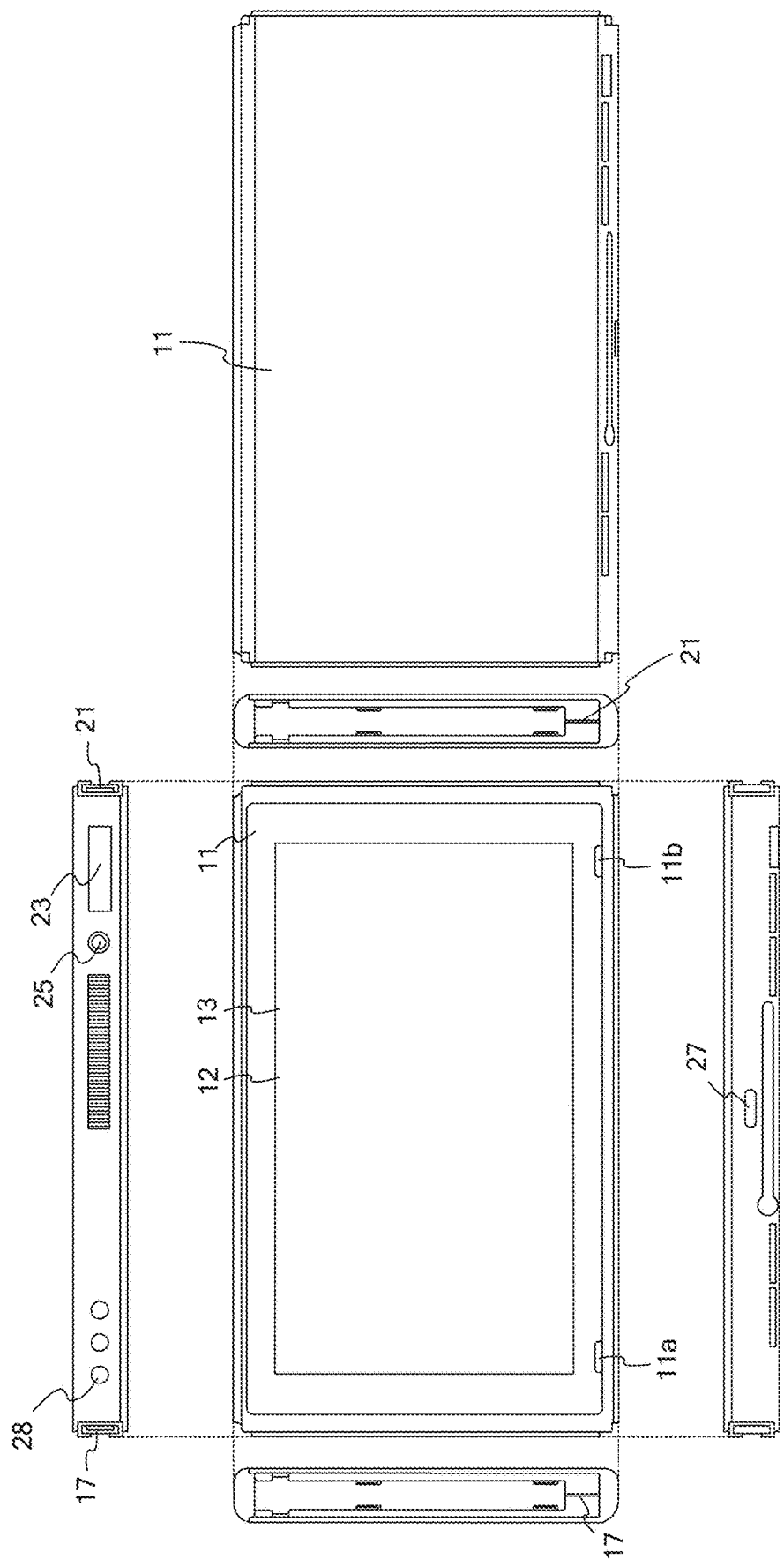
FIG. 3 is illustrative non-limiting six orthogonal views showing an example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing H are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, Which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23, The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body, apparatus 2 alone mounted on the cradle. Further, the cradle has the function of a hub device (specifically, a USB hub).

Figure 4:
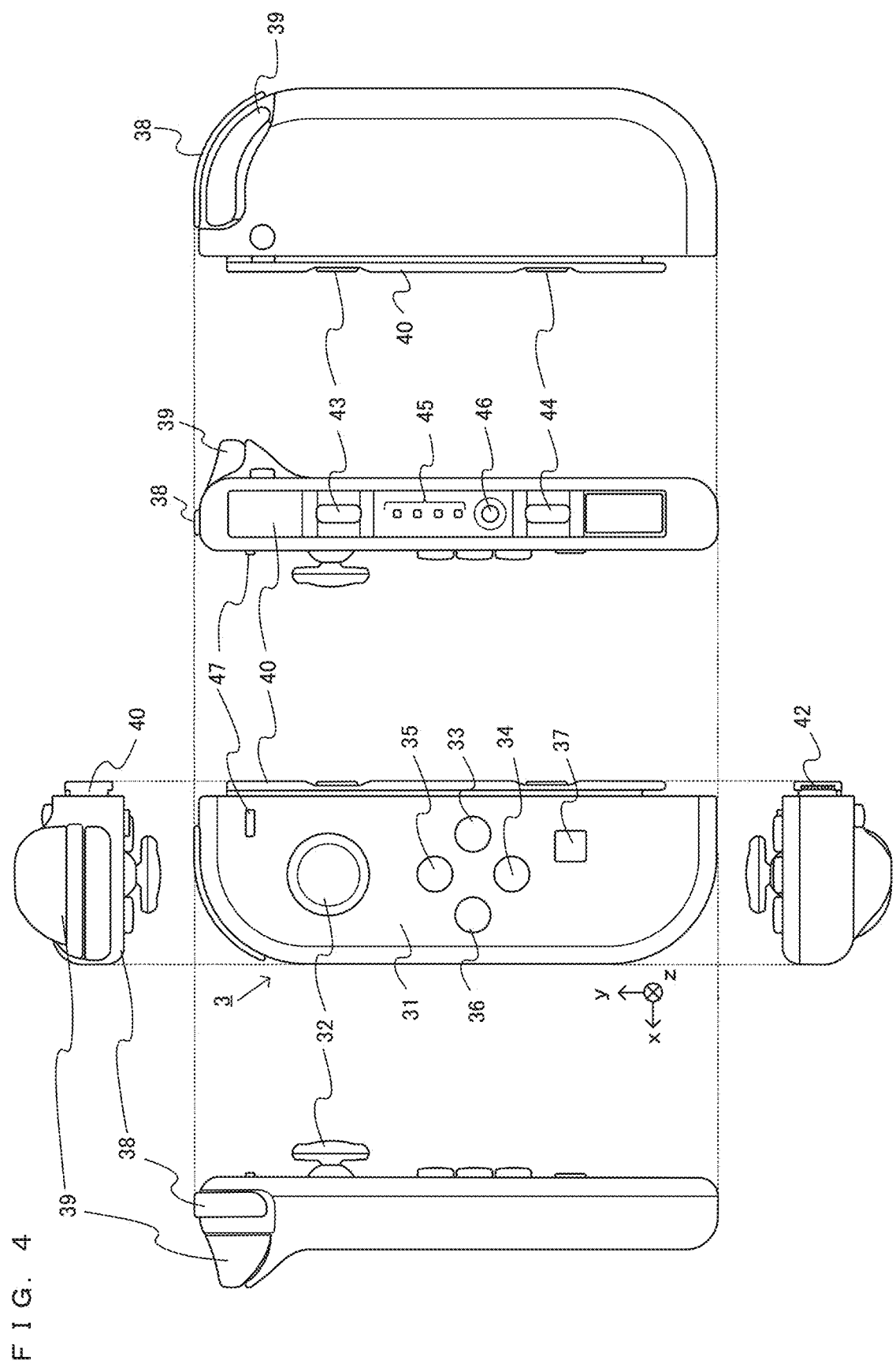
FIG. 4 is illustrative non-limiting six orthogonal views showing an example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state Where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing. 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
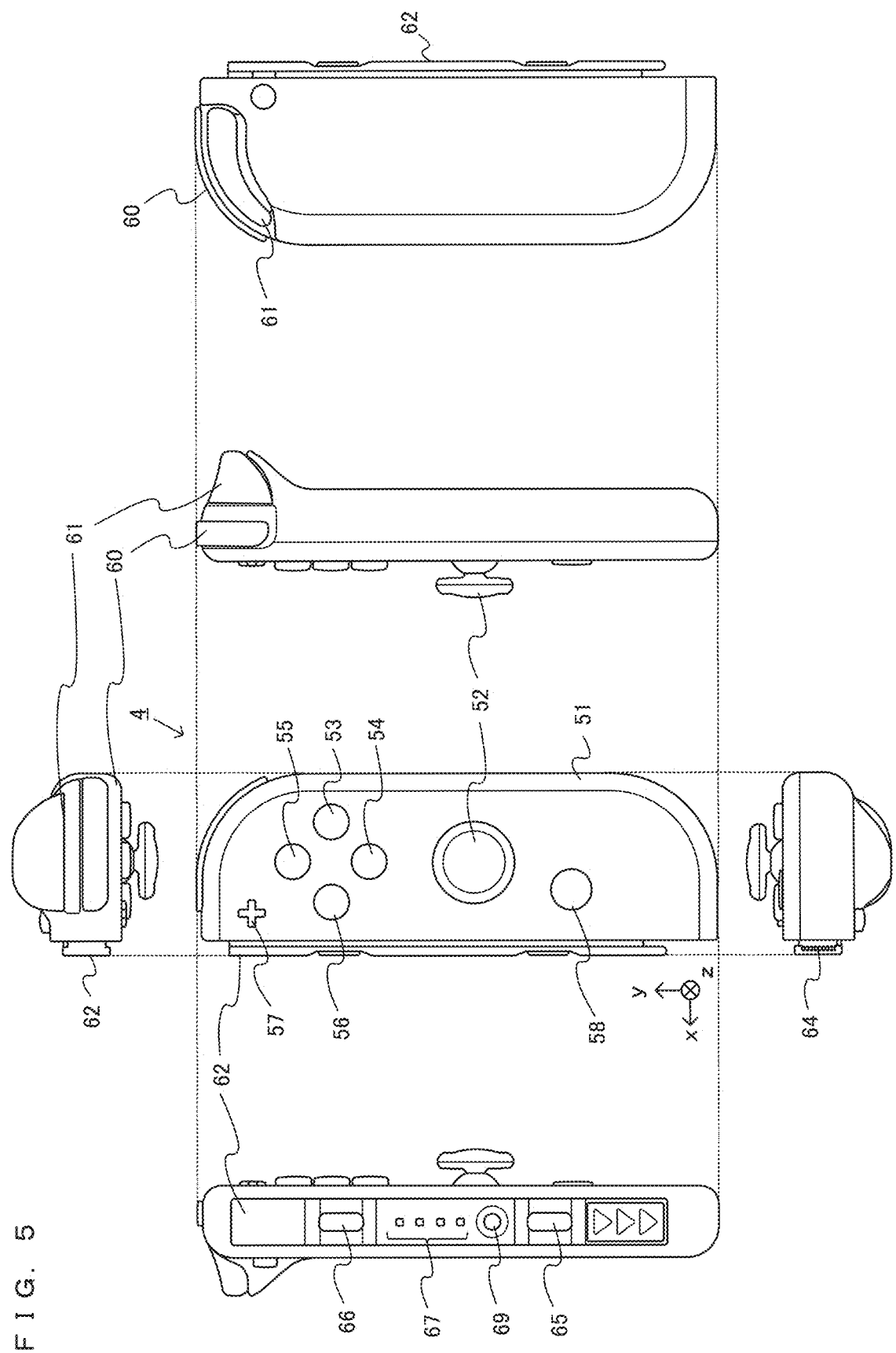
FIG. 5 is illustrative non-limiting six orthogonal views showing an example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
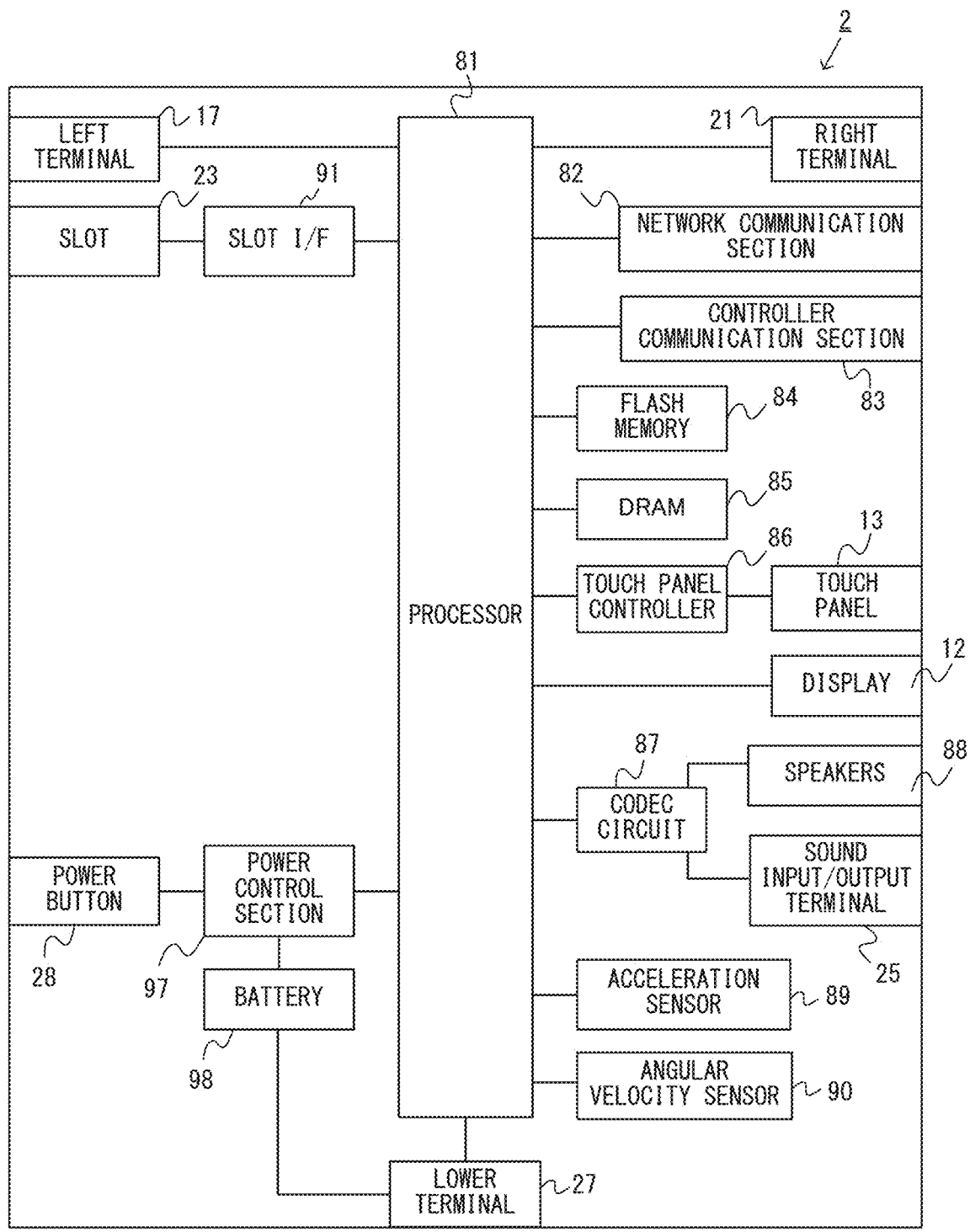
FIG. 6 is an illustrative non-limiting block diagram showing an example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional, in the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1).

It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
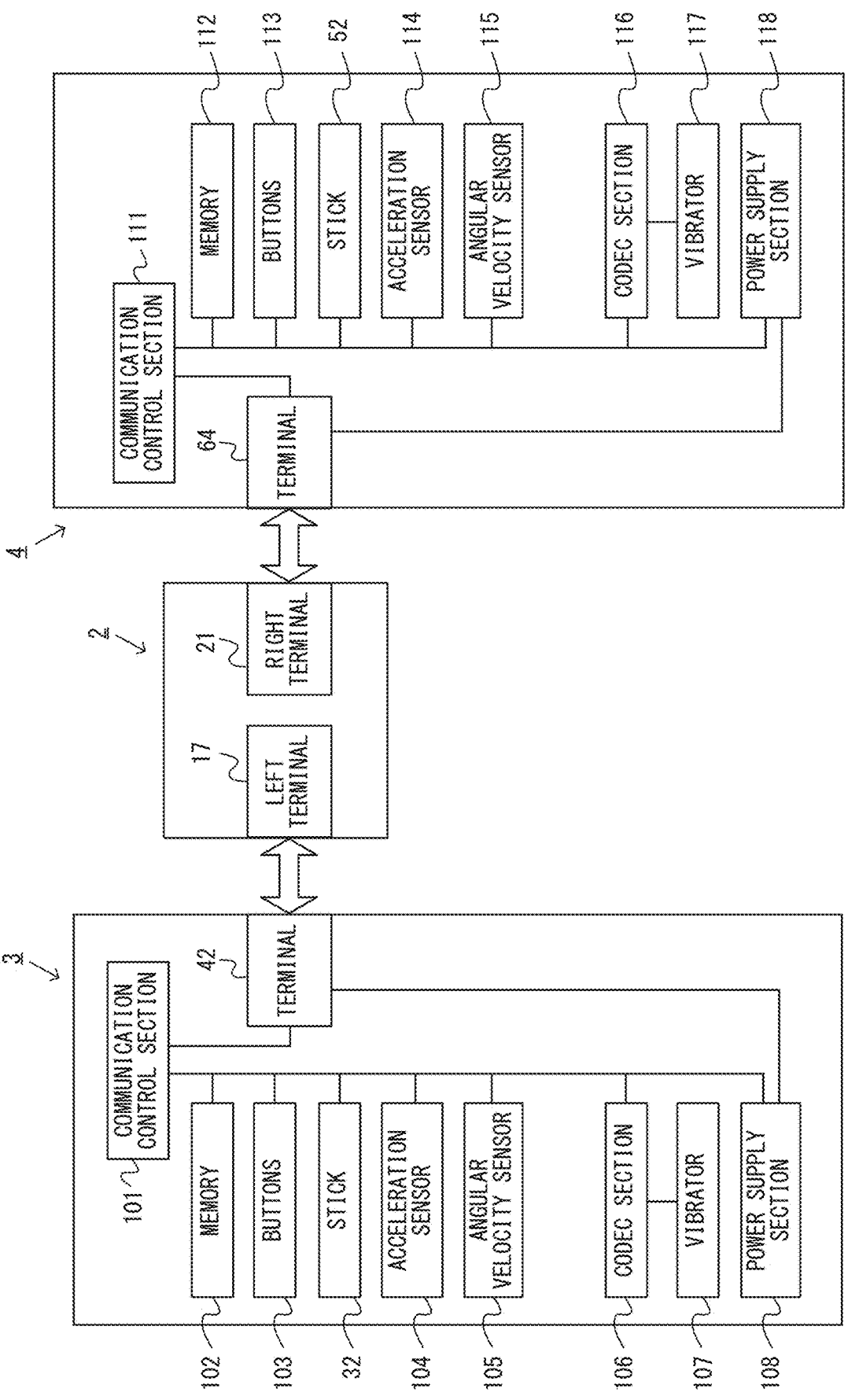
FIG. 7 is an illustrative non-limiting block diagram showing an example of the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes a power supply section 118. The power supply section 118 has a function similar to that of the power supply section 108 of the left controller 3 and operates similarly to the power supply section 108.

Overview of Game According to Exemplary Embodiment

Figure 8:
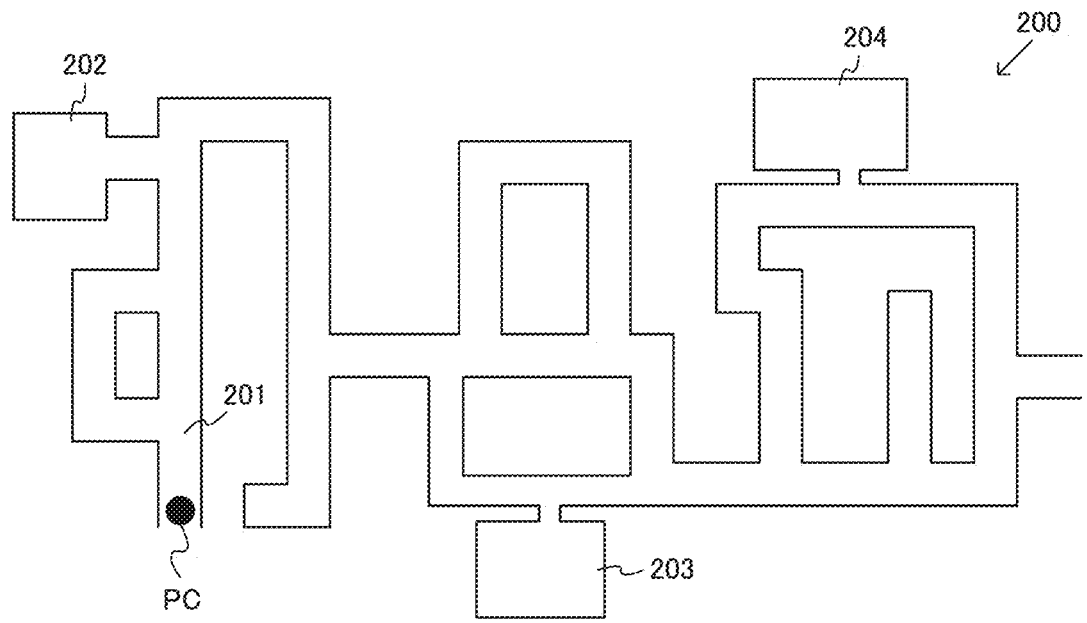
FIG. 8 is an example non-limiting diagram showing an example of a virtual space where a game according to the exemplary embodiment is performed.

Next, an overview of a game according to the exemplary embodiment is described. FIG. 8 is a diagram showing an example of a virtual space where the game according to the exemplary embodiment is performed. FIG. 8 shows a part of the virtual space and shows a diagram showing a partial virtual space 200 viewed from above.

On a display device (the display 12 or the stationary monitor), an image in which the virtual space is viewed from above (a bird's-eye view image) as shown in FIG. 8 may be displayed, or an image viewed from a virtual camera provided in the periphery of a player character PC may be displayed, or an image viewed from the viewpoint of the player character PC may be displayed, or these plurality of images may be displayed.

As shown in FIG. 8, in the virtual space 200, a player character PC operated by a player is placed. For example, the player character PC moves on a field in the virtual space in accordance with an operation on the analog stick 32. Specifically, the player character PC moves along a passage 201. In the virtual space 200, one or more appearance areas (202 to 204) are set. The player character PC can move along the passage 201 and enter the appearance areas 202 to 204. If the player character PC enters any of the appearance areas 202 to 204, the scene where the player character PC moves along the passage 101 switches to the scene of the inside of the appearance area.

An appearance area is an area where a plurality of characters different from the player character PC appear. In each of the appearance areas 202 to 204, a plurality of characters selected from among the plurality of characters by a lottery are placed. The plurality of characters caused to appear are characters controlled by the processor 81 and move in the appearance area.

The plurality of characters are classified into a plurality of types. For example, the plurality of characters are classified into types A to E. The type of a character indicates the characteristics of the character. For example, the type A has the characteristics of water, and the type B has the characteristics of fire. As will be described below, there is a case where characters battle against each other, and the chemistry between the characters differs depending on the types of the characters. For example, a character of the type A having the characteristics of water has an advantage over a character of the type B having the characteristics of fire.

Figure 9:
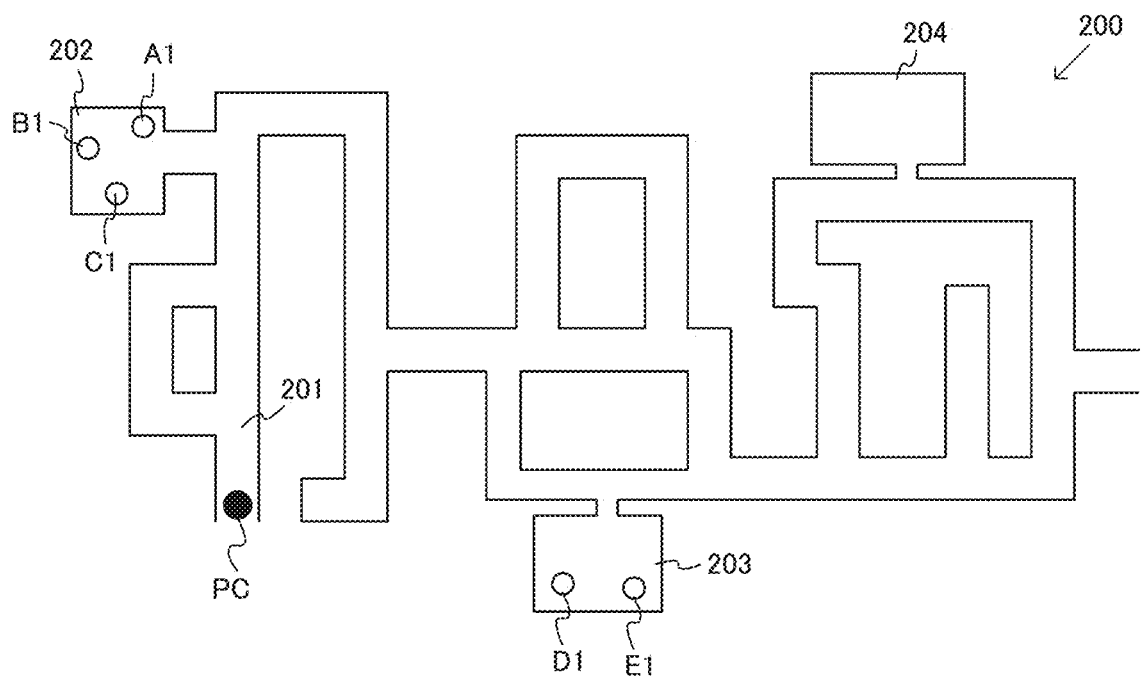
FIG. 9 is an example non-limiting diagram showing an example of the virtual space where a plurality of characters are placed.

FIG. 9 is a diagram showing an example of the virtual space where the plurality of characters are placed. Normally, characters to be placed in the appearance areas 202 to 204 are selected in accordance with preset probabilities. For example, a probability PA with which a character of the type A is selected, a probability PB with which a character of the type B is selected, a probability PC with which a character of the type C is selected, a probability PD with which a character of the type D is selected, and a probability PE with which a character of the type E is selected are preset. For example, each of the probabilities PA to PE is preset to 20%. Here, the probability set for each character type is referred to as "P".

The probabilities PA to PE differ in accordance with each appearance area. For example, in the appearance area 202, the selection probabilities of all the types of characters are equal to each other, whereas in the appearance area 203, the selection probability PA of a character of the type A having the characteristics of water is set to be relatively high and is set to 40%, for example. On the other hand, in the appearance area 203, the selection probability PB of a character of the type B having the characteristics of fire is set to be relatively low, and may be set to 5% or may be set to 0%, for example.

A plurality of characters are prepared for each type. For example, as the characters of the type A, n characters A1 to An are prepared. Each of the characters A1 to An has a unique character name and a unique external appearance (shape, pattern, or the like). As the characters of the type B, m characters B1 to Bm are prepared. Each of the character B1 to Bm also has a unique character name and a unique external appearance (shape, pattern, or the like). The same applies to the characters of the other types.

Figures 10, 11:
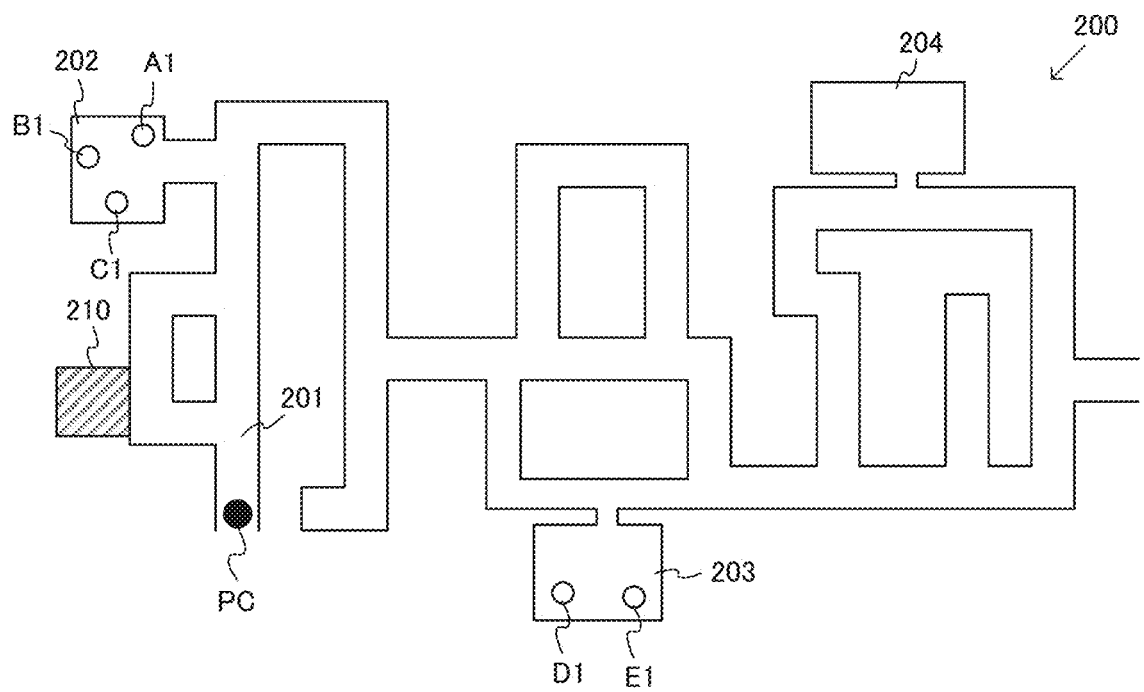
FIG. 10 is an example non-limiting diagram showing an example of an appearance probability set for each character.
FIG. 11 is an example non-limiting diagram showing an example of the virtual space where a room 210 is set.

The plurality of characters include a character likely to appear (a normal character) and a character less likely to appear (a rare character), and an appearance probability is set in advance for each character. FIG. 10 is a diagram showing an example of the appearance probability set for each character. For example, if it is determined that a character of the type A is to appear, in accordance with the appearance probability set for each of the characters A1 to An belonging to the type A, it is determined which of the characters A1 to An is to appear. For example, the appearance probabilities of the characters A1, A2, . . . , An are preset to 10%, 10%, . . . , 1%, respectively. The appearance probabilities of the characters B1, B2, . . . , Bm are preset to 10%, 10%, . . . , 0.5%, respectively. Here, the probability set for each character is referred to as "p".

Here, a description is given of an example of a method for causing a plurality of characters to appear in an appearance area in the virtual space. For example, in the exemplary embodiment, the total number of characters to appear at a predetermined timing is determined, and based on the determined total number, the types of characters to appear and the number of characters to appear are determined in accordance with the probability P set with respect to each type. Then, if the number of appearances with respect to each character type is determined, characters to appear are determined in accordance with the probability p shown in FIG. 10.

For example, at the timing of transition to a certain scene in the game, characters to appear in the certain scene may be determined. For example, when another virtual space transitions to the virtual space 200 shown in FIG. 8, characters to appear in the appearance areas 202 to 204 in the virtual space 200 may be determined. When the scene where the player character PC moves along the passage 201 transitions to the scene of the inside of the appearance area 202, characters to appear in the appearance area 202 may be determined. At the start of the game, characters to appear in an appearance area may be determined. The timing when characters to appear is determined is not limited to the above, and may be any timing.

For example, if it is determined that a total of ten characters are to appear in a certain appearance area, the number of appearances with respect to each character type among the ten characters is determined based on the probabilities PA to PE. For example, if the probabilities PA to PE have the same value, two characters of each of the types A to E are likely to be determined. If the number of appearances with respect to each character type is determined, characters to appear are determined based on the probability p set for each character. For example, if it is determined that two characters of the type A are to appear, any two of the characters A1 to An are determined in accordance with the probability set for each of the characters A1 to An shown in FIG. 10.

The order of the process of causing a plurality of characters to appear is merely an example, and is not limited to the above order. For example, after candidates for characters to appear are determined based on the probability p set for each character, the number of appearances with respect to each character type may be determined based on the probability P.

The thus determined plurality of characters are placed in the virtual space. For example, as shown in FIG. 9, the characters A1, B1, and C1 are placed in the appearance area 202, and the characters D1 and E1 are placed in the appearance area 203. If the characters are placed in the virtual space, the type, the character name, and the position of each character are displayed so that the player can recognize the type, the character name, and the position of the character. The placement positions of the characters in each appearance area may be randomly determined, or may be preset positions.

For example, the bird's-eye view image as shown in FIG. 9 may be displayed on the display device, and icon images relating to the characters may be displayed at the placement positions of the characters. A virtual camera may be set behind the player character PC, and an image of a part of the virtual space included in the image capturing range of the virtual camera may be displayed on the display device. In this case, when the player character PC is moving on the passage 201, the characters placed in each appearance area cannot be viewed, but for example, if the player character PC enters the appearance area 202, the external appearances of the characters A1, B1, and C1 in the appearance area 202 can be viewed. Text indicating the character names may be displayed, whereby the types and the character names of the placed characters may be able to be recognized.

The player moves the player character PC to the position of each character and brings the player character PC close to the character. For example, if the player character PC comes close to the character A1, the scene transitions to a battle scene with the character A1. In the battle scene, the player character PC and the character A1 battle against each other. If the player character PC succeeds in capturing the character A1, the player character PC acquires the character A1. From this point onward, the character A1 is a character owned by the player character PC, and the player can use the character A1 in the game.

(Change in Appearance Probability of Character)

In the game according to the exemplary embodiment, the preset appearance probability of a character (the total number of characters to appear, the probability P set with respect to each character type, and the appearance probability determined based on the probability p set with respect to each individual character) is changed based on an operation input provided by the player. A description is given below of a method for changing the appearance probability of a character.

First, the player specifies a position in the virtual space and sets a room at the specified position. The room is a space that the player character PC can set in the virtual space, and is a space that the player character PC can enter. The player can set a single room (or a plurality of rooms) for themselves.

FIG. 11 is a diagram showing an example of the virtual space where a room 210 is set. The player moves the player character PC on the passage 201 and performs a predetermined operation for setting the room 210 at a desired position. For example, in a case where the player character PC owns a setting item for setting the room 210, and if the player character PC performs the predetermined operation toward a wall, the player character PC can set an entrance for entering the room 210 in the wall. If the player character PC comes close to the entrance, the player character PC enters the room 210. A setting condition for setting the room 210 may be that the player character PC owns a setting item for setting a room, or that a particular item is consumed. The setting condition may be that the player character PC talks to a predetermined character in the game, or that the player character PC defeats a predetermined enemy character, or that in-game currency or real currency is consumed.

Figure 12:
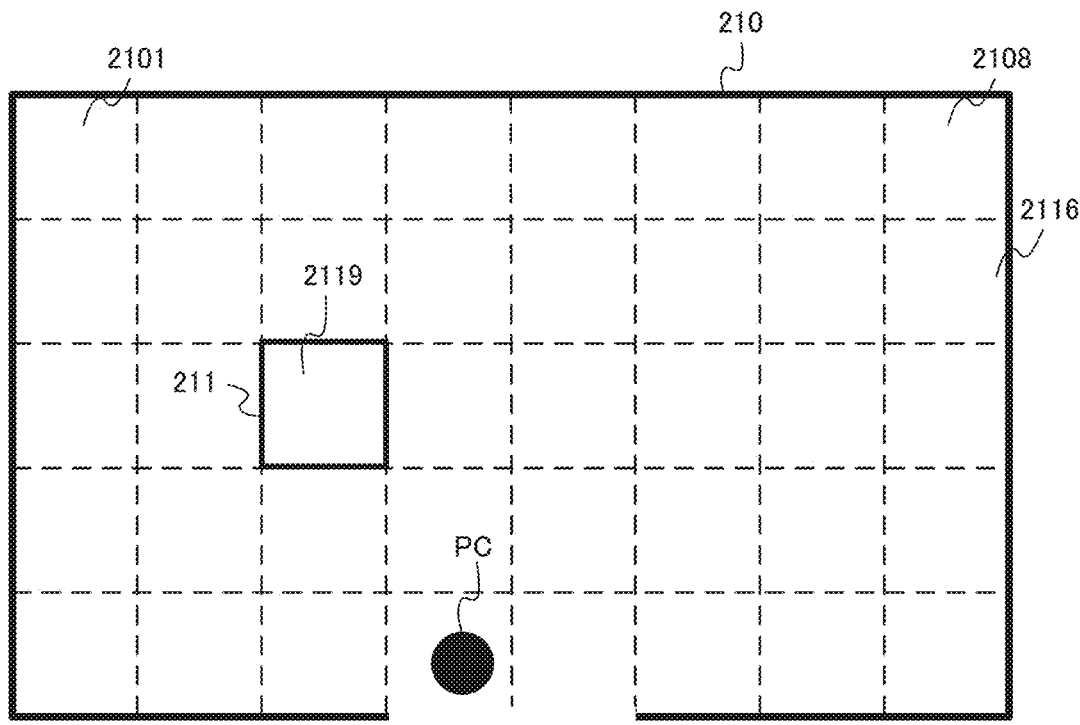
FIG. 12 is an example non-limiting diagram showing an example of the inside of the room 210 and is an example non-limiting diagram showing the state where a partial region in the room 210 is specified.
Figure 13:
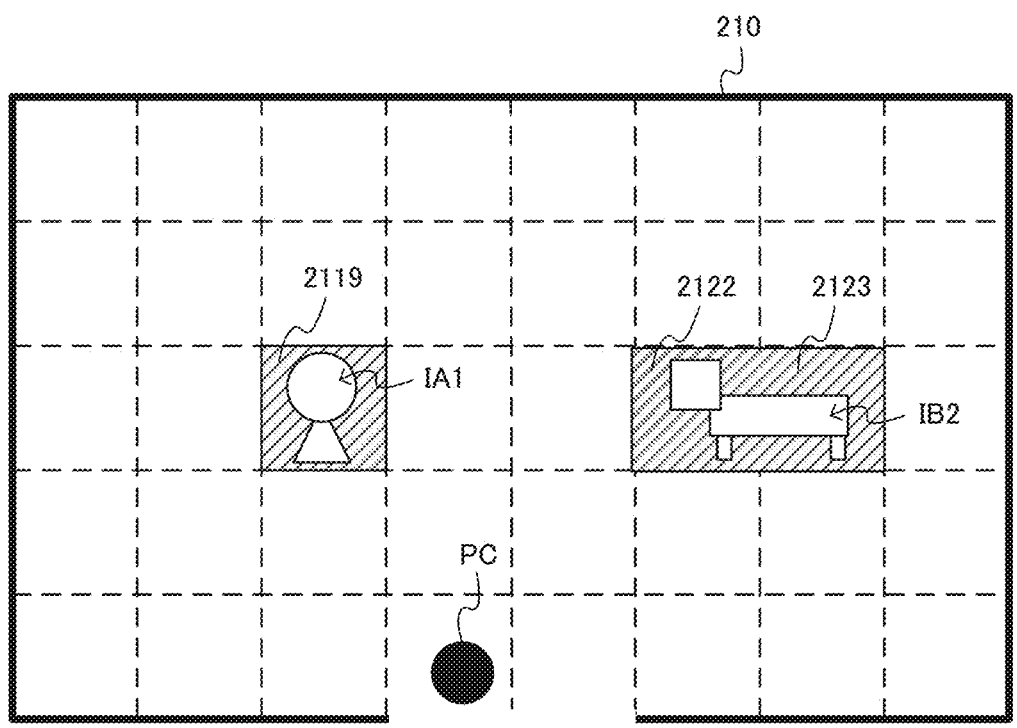
FIG. 13 is an example non-limiting diagram showing an example of the inside of the room 210 where an item object is placed.

FIG. 12 is a diagram showing an example of the inside of the room 210 and is a diagram showing the state where a partial region in the room 210 is specified. FIG. 13 is a diagram showing an example of the inside of the room 210 where an item object is placed.

If the player character PC enters the room 210, the screen switches to the scene of the inside of the room 210 as shown in FIG. 12. As shown in FIG. 12, the room 210 is divided into a plurality of regions in a grid. For example, the room 210 is divided into 40 square regions obtained by vertically arranging five squares and horizontally arranging eight squares. For example, the player character PC can move in the room 210 in accordance with an operation on the analog stick 32.

Based on an operation input on the controllers, a position in the room 210 is specified. For example, as shown in FIG. 12, a cursor 211 for specifying the position in the room 210 is displayed, and the position in the room 210 may be specified by moving the cursor 211 based on an operation input. The position in the room 210 may be specified by moving the player character PC. The position in the room 210 may be specified by inputting a coordinate position as numbers.

As shown in FIG. 12, if the player provides an operation input for placing a predetermined item object in the state where a region 2119 is specified, the predetermined item object is placed. For example, as shown in FIG. 13, an item object IA1 is placed in the region 2119. An item object is a virtual object owned by the player character PC and can be acquired by the player character PC in the process of the game. Specifically, an item object is an object relating to any of the above characters (the characters classified into A to E) and is an object representing the shape of any of the above characters. For each character, an item object relating to the character is prepared. The item objects are classified into a plurality of types (A to E) similarly to the characters.

For example, an item object is buried in the passage 201 or the appearance areas 202 to 204. The player moves the player character PC in the virtual space 200, thereby causing the player character PC to acquire the item object. For example, the player character PC acquires an item object IA1 relating to the character A1 and an item object IB2 relating to the character B2 in the virtual space 200.

An item object may be placed in a virtual space different from the virtual space 200, and the player character PC may be able to acquire the item object during the game. The player may be able to acquire an item object in exchange for another object owned by the player. The player may be able to acquire an item object in a battle against a character. The player may be able to acquire an item object by consuming in-game currency or real currency.

The player can select any of item objects owned by the player and place the selected item object at a desired position in the room 210. The player can change the position of the placed item object. In the room 210, there are a region where an item object can be placed and a region where an item object cannot be placed.

An item object has a predetermined size. If the item object is placed in a region specified in the room 210, the region is occupied by the item object. Thus, in the region where the item object is placed, another item object cannot be placed.

A plurality of item objects have different sizes. For example, there are an item object that occupies a single square region and an item object that occupies two square regions. In addition to these, an item object that occupies any number of square regions may be prepared.

In FIG. 13, the item object IA1 that occupies a single region 2119 and the item object IB2 that occupies two regions 2122 and 2123 are placed. The item object IA1 is an item object relating to the character A1. Since the character A1 is classified into the type A, the item object IA1 relating to the character A1 is also classified into the same type A. The item object IB2 is an item object relating to the character B2. Since the character 132 is classified into the type B, the item object IB2 relating to the character B2 is also classified into the same type B.

An Item object may not be an object relating to a character (e.g., an object representing the shape of a character). Also in this case, item objects are classified into a plurality of types similarly to the characters, and there are item object types relating to the character types.

Here, the state where the item object types "relate to" the character types includes the state where the item object types and the character types are the same as each other, or are not the same as each other but are associated with each other on a one-to-one basis. The state where the item object types "relate to" the character types includes the state where the item object types and the character types are associated with each other on a one-to-many basis. For example, an item object of a type X may be associated with a character of the type A and a character of the type B.

If an expansion condition is satisfied, the room 210 is expanded. The room 210 can be expanded multiple times. For example, if the first expansion is performed, the room 210 changes from regions for 40 squares to regions for 60 squares. If the room 210 is expanded, the number of regions where an item object can be placed increases, and more item objects can be placed. For example, if a predetermined condition is satisfied in the game, the room 210 is expanded. The room expansion condition is, for example, that the player character PC acquires an expansion item for the expansion of a room, or that a particular item is consumed. The room expansion condition may be that the player character PC talks to a predetermined character, or that the player character PC defeats a predetermined enemy character. The room expansion condition may be that in-game currency or real currency is consumed in accordance with an instruction from the player. In another exemplary embodiment, a room may not be expanded, and has a fixed size that is a sufficient size from the start.

The room 210 has the effect of changing the appearance rate of characters in a predetermined range in the virtual space relating to the room 210. Specifically, in accordance with the size of a region occupied by an item object placed in the room 210, the appearance rate of characters is changed in a predetermined range in the virtual space 200 relating to the room 210. More specifically, in accordance with the size of a region occupied by an item object placed in the room 210, the total number of characters to appear (the number of appearances of characters) is determined as being greater than normal in a predetermined range (specifically, in the appearance area 202) including the position of the room 210. In accordance with the type of the item object placed in the room 210, the appearance rate of characters of the type relating to the item object increases compared to normal.

FIG. 14 is a diagram showing an example of a change in the selection rate of the maximum number of appearances relating to the number of placement regions of an item object.

In FIG. 14, "the number of placement regions" indicates the size of a region occupied by all item objects placed in the room 210 and indicates the number of square regions occupied by all the item objects. If an item object occupying a single square region is placed, "the number of placement regions" is "1". If "the number of placement regions" is "0", this indicates a normal state where no item object is placed in the room 210.

In FIG. 14, "the selection rate of the maximum number of appearances" indicates the proportion of selection of the preset maximum value of the number of appearances of characters. In the exemplary embodiment, the maximum value of the number of appearances of characters is preset in accordance with an appearance area (or the virtual space). For example, in a certain appearance area, the number of appearances of characters is set so that a maximum of "10" characters appear. The number of characters to be actually placed in the appearance area is not necessarily "10", and follows predetermined probability distribution. As shown in FIG. 14, the selection rate of the maximum number of appearances in the normal state is an initial value (50%). That is, normally, the maximum number of appearances is selected with a probability of 50%, For example, if the maximum number of appearances is "10", "10" is selected as the number of appearances of characters with a probability of 50%. The numbers of appearances less than the maximum number of appearances also follow the predetermined probability distribution. For example, the selection rate of "the maximum number of appearances—1" may be set to 30%, and the selection rate of "the maximum number of appearances—2" may be set to 10%.

As shown in FIG. 14, if the number of placement regions of an item object is 1 to 10, for example, the proportion of selection of the maximum number of appearances is increased by 5% from the initial value, and the proportion of selection of the maximum number of appearances is 55%. That is, if the number of placement regions is 1 to 10, the number of appearances of characters is likely to be greater than normal. If the number of placement regions is 11 to 20, the proportion of selection of the maximum number of appearances is the initial value+10% (60%). If the number of placement regions is 21 to 30, the proportion of selection of the maximum number of appearances is the initial value+ 15% (65%).

If the number of placement regions is 41 to 50, the proportion of selection of the maximum number of appearances is 75%. The room 210 before the expansion is a region having 40 squares and includes a region where an item object cannot be placed. Thus, in the room 210 before the expansion, item objects cannot be placed in more than 40 square regions. If, however, the room 210 is expanded as described above, the number of regions for placing item objects increases, and the number of placement regions of an item object can be greater than or equal to 40. The more expanded the room 210 is, the more item objects can be placed. Thus, it is possible to cause more characters to appear.

As described above, the greater the region of item objects occupying the inside of the room 210 is, the higher the probability of selecting the maximum number of appearances of characters is. Thus, it is possible to cause more characters to appear in a predetermined range (the appearance area 202) relating to the room 210.

If an item object is placed in the room 210, "the selection rate of the maximum number of appearances" may be increased, and "the preset maximum value of the number of appearances of characters" may also be increased. If an item object is placed in the room 210, "the selection rate of the maximum number of appearances" may not be increased, and the total number of characters to appear may be simply increased. For example, in a case where ten characters normally appear, and if an item object is placed, the number of appearances of characters may be increased to 11, 12, . . . in accordance with the size of the region of the item object.

Based on the number of placement regions with respect to each item object type in the room 210, the number of appearances with respect to each character type is determined, the number of appearances with respect to each character type is calculated based on the appearance rate set with respect to each character type.

FIG. 15 is a diagram showing an example of the increase/decrease amount of the appearance rate with respect to each character type relating to the number of placement regions of an item object of the type A. FIG. 16 is a diagram showing an example of the increase/decrease amount of the appearance rate with respect to each character type relating to the number of placement regions of an item object of the type B.

In FIG. 15, "the number of placement regions of items of the type A" indicates the number of square regions occupied by item objects classified into the type A among all the item objects placed in the room 210. As shown in FIG. 15, if the number of placement regions of items of the type A is 0, the increase/decrease amount of the appearance rate with respect to each character type is "0" and is set to an initial value. For example, each of the initial values of the appearance rates of the respective types is 20%. The initial values set for the respective types differ in accordance with the appearance area. For example, the initial value of the appearance rate of the characters of the type A may be set to 30% in another appearance area, whereas the initial value of the appearance rate of the characters of the type B may be set to 5%. In a certain appearance area, the appearance rate of characters of a particular type may be set to "0".

If the number of placement regions of items of the type A is 1 to 10, the appearance rate of the characters of the type A is increased from the initial value. For example, if the number of placement regions of items of the type A is 1 to 10, the increase amount of the appearance rate of the characters of the type A is 5%, and the appearance rate of the characters of the type A is changed to "the initial value +5% (i.e., 25%)". By an amount corresponding to the increase in the appearance rate of the characters of the type A, the appearance rate of characters of another type is decreased from the initial value. For example, the decrease amount of the appearance rate of the characters of the type B is 2%, and the appearance rate of the characters of the type B is changed to "the initial value −2% (i.e., 18%)". The decrease amount of the appearance rate of characters of the type C is 1%, and the appearance rate of the characters of the type C is changed to "the initial value −1% (i.e., 19%)". As described above, if the appearance rate of the characters of the type A increases, the appearance rate of the characters of the type B having characteristics contrasting those of the type A may be more decreased than that of the other types C to E.

If the appearance rate of the characters of the type A increases, the appearance rates of characters of the other types B to E may be uniformly decreased, or the decrease amounts of the appearance rates of characters of the other types B to E may differ in accordance with the appearance area, or the decrease amount of the appearance rates of characters of the other types B to E may be randomly determined. Based on an operation input provided by the player, the appearance rate with respect to each character type may be changed.

As shown in FIG. 15, if the number of placement regions of items of the type A is 11 to 20, the appearance rate of the characters of the type A is changed to "the initial value +10% (i.e., 30%)". On the other hand, the appearance rate of the characters of the type B is changed to "the initial value −4% (i.e., 16%)", and the appearance rate of the characters of the type C is changed to "the initial value −2% (i.e., 18%)".

As shown in FIG. 16, in accordance with "the number of placement regions of items of the type B", the appearance rate of the characters of the type B is increased. "The number of placement regions of items of the type B" indicates the number of square regions occupied by item objects classified into the type B among all the item objects placed in the room 210.

As shown in FIG. 16, if the number of placement regions of items of the type B is 1 to 10, the increase amount of the appearance rate of the characters of the type B is 5%, and the appearance rate of the characters of the type B is changed to "the initial value +5% (i.e., 25%)". On the other hand, the decrease amount of the appearance rate of the characters of the type A is 2%, and the appearance rate of the characters of the type A is changed to "the initial value −2% (i.e., 18%)". The appearance rate of the characters of the type C is changed to "the initial value −1% (i.e., 19%)".

If the number of placement regions of items of the type B is 11 to 20, the appearance rate of the characters of the type B is changed to "the initial value +10% (i.e., 30%)". On the other hand, the appearance rate of the characters of the type A is changed to "the initial value −4% (i.e., 16%)", and the appearance rate of the characters of the type C is changed to "the initial value −2% (i.e., 18%)".

In addition to FIGS. 15 and 16, a similar table for changing the appearance rate of each character is prepared in advance with respect to each type of a placed item object.

In the room 210, item objects of a plurality of types can be placed, if item objects of a plurality of types are placed, the appearance rate of characters is changed with respect to each item object type in accordance with the tables in FIGS. 15, 16, and the like. For example, if an item object IA of the type A is placed and an item object IB of the type B is placed in the room 210, the appearance rate of each character is changed based on FIGS. 15 and 16.

For example, a value obtained by adding the increase/decrease amount of the appearance rate of each character in accordance with FIG. 15 and the increase/decrease amount of the appearance rate of each character in accordance with FIG. 16 may be calculated as the increase/decrease amount of the appearance rate of each character relative to the initial value. For example, if the number of placement regions of the item object IA of the type A is 5, and the number of placement regions of the item object IB of the type B is 15, the increase amount of the appearance rate of the characters of the type A is a value "1%" obtained by adding "−4%" (see FIG. 16) to "+5%" (see FIG. 15). The increase amount of the appearance rate of the type B is a value "8%" obtained by adding "+10%" (see FIG. 16) to "−2%" (see FIG. 15).

Instead of merely adding the respective increase/decrease amounts, for example, the increase/decrease amount of the appearance rate of each character may be calculated by weighting the respective types. If item objects of a plurality of types are placed, the appearance rates of characters of all the types max be changed using a predetermined function in which the item object types and the number of placement regions are parameters.

As described above, the appearance rate of characters of a type relating to the type of an item object placed in the room 210 is increased. Specifically, the larger the region of an item object of the same type occupying the room 210 is, the more increased the appearance rate of the characters of the type is. This makes a character of the type relating to the type of the item object placed in the room 210 likely to appear.

In the exemplary embodiment, in an appearance area where the appearance rate of characters of a particular type is set to "0" in the normal state (i.e., the state where no item object is placed), even if an item object of the particular type is placed, the appearance rate of characters of the particular type does not become greater than "0". That is, the effect of the room 210 is not produced for a character that does not appear in the normal state. In another exemplary embodiment, even in the case of a character of which the appearance rate is set to "0" in the normal state, if an item object is placed, the appearance rate may be increased.

As described above, if an item object is placed in the room 210, the total number of characters to appear is likely to be increased in accordance with FIG. 14, and the appearance rate of characters of a type relating to the type of the placed item object is also increased in accordance with FIG. 15 or the like, Thus, it is possible to make a character of the type relating to the type of the placed item object likely to appear.

If the appearance rates of characters of the respective types are changed as described above, based on the total number of characters to appear and the changed appearance rate with respect to each type, the number of appearances with respect to each character type is calculated. Then, as described above, characters to actually appear are determined by the lottery in accordance with FIG. 10.

In another exemplary embodiment, based on an item object placed in the room 210, the appearance rate with respect to each character type may be changed, and the appearance rate of each individual character may also be changed. That is, the appearance rate of each individual character shown in FIG. 10 may be changed in accordance with the item object placed in the room 210. For example, if the item object IA1 relating to the character A1 is placed, as described above, the appearance rate of the characters of the type A is increased, and the appearance rate p of the character A1 among the characters of the type A may also be increased. That is, if the item object IA1 relating to the character A1 is placed, a character of the type A may be likely to appear, and the character A1 may also be likely to appear. Conversely, if the item object IA1 relating to the character A1 is placed, the appearance rate of the characters of the type A may be increased, whereas the appearance rate p of the character A1 may be decreased.

Figure 17:
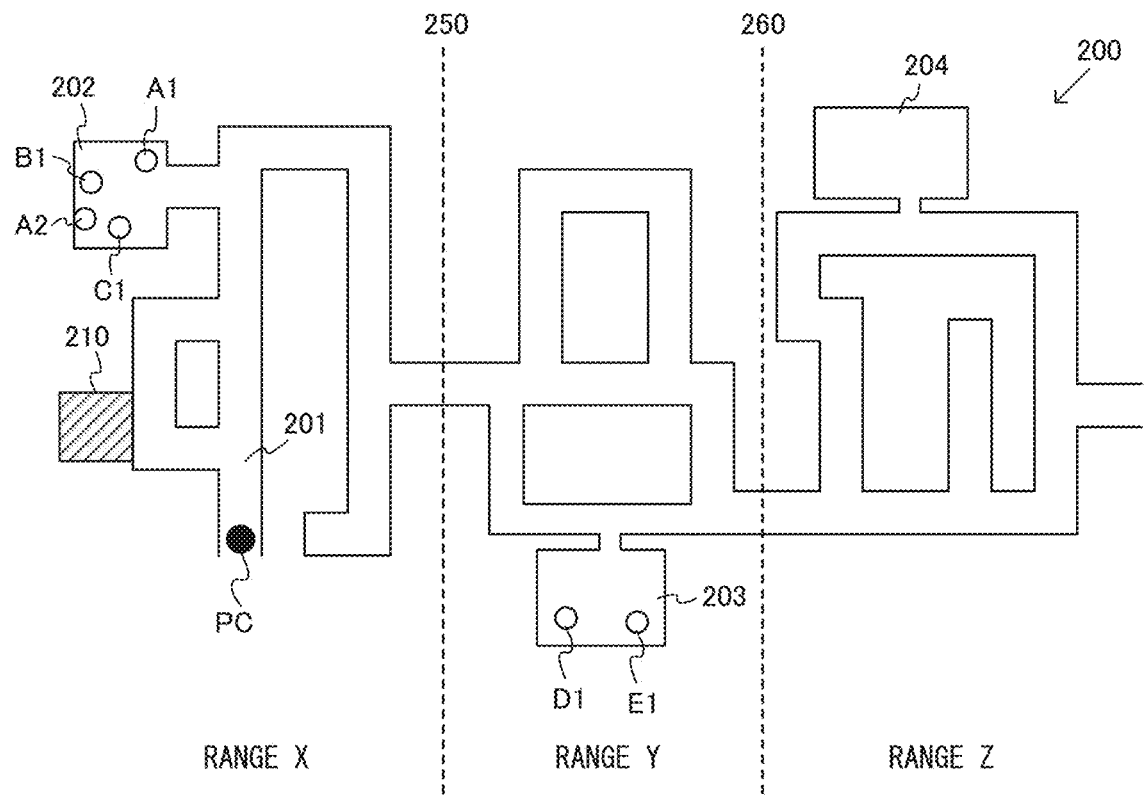
FIG. 17 is an example non-limiting diagram showing an example of the virtual space in a case where the appearance rate of characters of the type A is increased by placing an item object of the type A in the room 210.

FIG. 17 is a diagram showing an example of the virtual space in a case where the appearance rate of the characters of the type A is increased by placing an item object of the type A in the room 210.

As shown in FIG. 17, in the appearance area 202, the character A2 is placed in addition to the characters A1, B1, and C1. Here, since the item object of the type A is placed in the room 210, the total number of characters to appear increases, and the appearance rate of the characters of the type A is also increased. Then, as a result of a lottery held in accordance with the changed appearance rate, the character A2 is placed in the appearance area 202. A lottery based on a probability is held, and therefore, a result as shown in FIG. 17 is not necessarily obtained. Even in a case where the item object of the type A is placed in the room 210, the number of characters of the type A to appear can be smaller than in the normal state.

In the exemplary embodiment, in accordance with the position in the virtual space of the room 210 set by the player, a range where the appearance rate of a character is influenced differs. For example, as shown in FIG. 17, if the room 210 is set in a range X on the left side of a dashed line 250, the appearance rate of a character in the range X (specifically, the appearance rate of a character in the appearance area 202) is changed. If the room 210 is set in a range V between the dashed line 250 and a dashed line 260, the appearance rate of a character in the range Y (specifically, the appearance rate of a character in the appearance area 203) is changed.

In another exemplary embodiment, the virtual space 200 may not be divided into a plurality of ranges, and an item object set in the room 210 may influence the entirety of the virtual space 200.

In the above description, the plurality of characters are placed in the appearance areas 202 to 204, but the plurality of characters may also be placed on the passage 201. In this case, if characters appear in the entirety of the virtual space including the passage 201 and the appearance areas 202 to 204, and an item object is placed in the room 210, the appearance rates of the characters are changed by the above method.

(Reception of Room Data from Another Player)

The main body apparatus 2 according to the exemplary embodiment can communicate with another main body apparatus 2 through communication via the Internet or a wireless LAN or through local communication between the main body apparatuses. The main body apparatus 2 may be able to communicate with another main body apparatus 2 through wired communication.

If the room 210 is set in the main body apparatus 2, room data related to the room 210 is generated and stored in the main body apparatus 2. The room data includes position data indicating the position in the virtual space 200 of the room 210 and data regarding an item object placed in the room 210 (data indicating the type of each item object, the name of the item object, the placement position of the item object, and the like).

Also in another main body apparatus 2, similarly to the above, a player relating to the other main body apparatus 2 can set a room at a desired position in a virtual space. If a room is set in the other main body apparatus 2, room data is generated and stored in the other main body apparatus 2.

The main body apparatus 2 can acquire room data from another apparatus. For example, if a predetermined communication condition holds, the main body apparatus 2 and another main body apparatus 2 can exchange pieces of room data stored in the main body apparatus 2 and the other main body apparatus 2. For example, in the state where the main body apparatus 2 and the other main body apparatus 2 can locally communicate with each other (e.g., are located at a predetermined distance from each other) and in a case where a predetermined exchange condition is satisfied (e.g., in a case where the player character PC is present in the virtual space 200), the main body apparatus 2 and the other main body apparatus 2 exchange the pieces of room data.

If the main body apparatus 2 is connected to the Internet, the main body apparatus 2 may be able to download room data on another player uploaded from the other main body apparatus 2 and saved in a server on the Internet.

Figure 18:
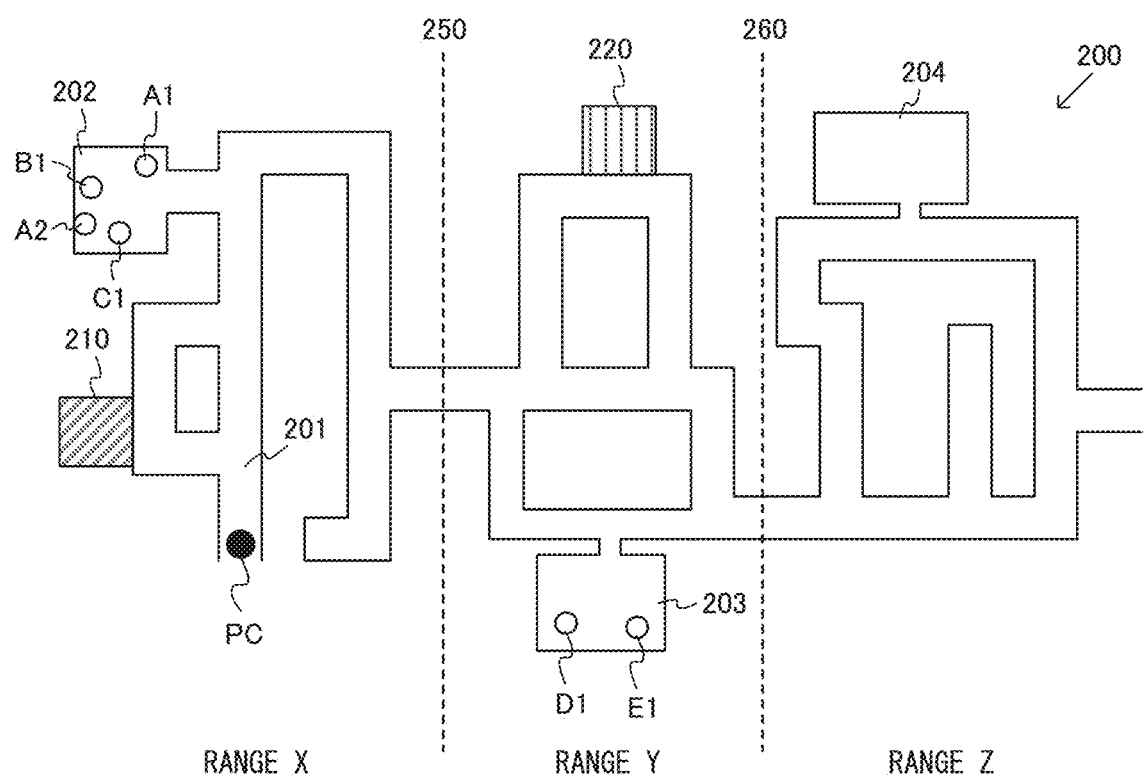
FIG. 18 is an example non-limiting diagram showing an example of the virtual space in a case where the main body apparatus 2 receives room data on another player from another apparatus.

FIG. 18 is a diagram showing an example of the virtual space in a case where the main body apparatus 2 receives room data on another player from another apparatus.

As shown in FIG. 18, in the virtual space 200, in addition to the room 210 set by the player of the main body apparatus 2, a room 220 based on room data received from another apparatus is set. The room 220 is a room created in another main body apparatus 2 by another player, and in the room 220, an item object is placed based on an operation input provided by the other player. Based on position data included in the room data received from the other apparatus, the main body apparatus 2 creates the room 220 at the same position as the position where the room 220 is set by the other player in the virtual space 200. Based on data regarding the item object included in the room data received from the other apparatus, the main body apparatus 2 also places the item object in the room 220.

If the player character PC moves along the passage 201 and reaches the vicinity of the entrance of the room 220, the player character PC can enter the room 220. Consequently, the player can view the item object placed by the other player. As described above, in the exemplary embodiment, players can enter rooms created by partners and view item objects placed by the partners.

The player can also choose to enable or disable the effect of the room 220. By default, the effect of the room 220 may be set to enabled, and in accordance with an instruction from the player, the effect of the room 220 may be disabled. The player may be able to individually specify an item object among a plurality of item objects placed in the room 220 and set only the specified item object to enabled or disabled. By the enabled/disabled setting operation of the player, all the item objects placed in the room 220 may be enabled or disabled. Further, the player can also choose to enable or disable the effect of the room 210 set by the player. That is, the player can also disable the effect of the room 210 of the player and enable only the effect of the room 220 of the other player.

If the effect of the room 220 created by the other player is enabled, the room 220 produces an effect similar to that in a case where the room 210 created by the player of the main body apparatus 2 is enabled. That is, in a predetermined range in the virtual space relating to the room 220, the appearance rate of a character of a type relating to the type of an item object placed in the room 220 is changed. Specifically, the room 220 is located in the range Y in the virtual space 200, and therefore, the appearance rate of a character in the range Y (specifically, the appearance area 203) is changed.

If the room 220 and the room 210 are located in the same range X, the effect of the room 210 and the effect of the room 220 are produced in the range X. For example, if the appearance rate of the characters of the type A is increased by 5% by the room 210, and the appearance rate of the characters of the type A is increased by 5% by the room 220, the two effects may be totaled, thereby increasing the appearance rate of the characters of the type A by 10%. The appearance rate of the characters of the type A may be increased by 5% by the room 210, and the appearance rate of the characters of the type B may also be increased by 5% by the room 220.

The effects of a plurality of rooms may also be obtained by producing a comprehensive effect based on the plurality of rooms, instead of merely calculating the effects of the plurality of rooms as the sum of these effects. For example, if the appearance rate of the characters of the type A is increased by 5% by the room 210, and the appearance rate of the characters of the type A is increased by 10% by the room 220, the appearance rate of the characters of the type A may be increased by 10% as the comprehensive effect of the two rooms. That is, as the comprehensive effect of the plurality of rooms, the highest effect may be produced. For example, if the effects of the plurality of rooms are produced, the total number of characters to appear may increase.

The main body apparatus 2 may be able to receive a plurality of pieces of room data created by other players. If the main body apparatus 2 further receives room data created by yet another player in addition to the room data related to the room 220, the main body apparatus 2 sets another room 230 in the virtual space 200 based on the received room data. The room 230 also has the effect of changing the appearance rate of a character similarly to the above.

(Details of Game Processing)

Next, an example of game processing performed by the main body apparatus 2 is specifically described. First, data stored in the main body apparatus 2 is described.

Figure 19:
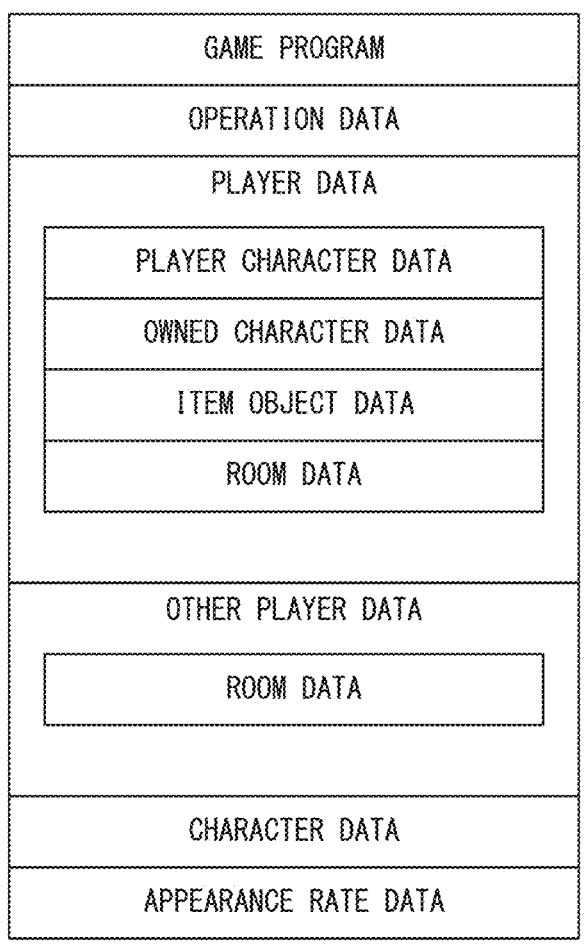
FIG. 19 is an example non-limiting diagram showing an example of data stored in a memory (mainly, a DRAM 85) of the main body apparatus 2.

FIG. 19 is a diagram showing an example of data stored in a memory (mainly, the DRAM 85) of the main body apparatus 2. As shown in FIG. 19, the main body apparatus 2 stores a game program, operation data, player data, other player data, character data, and appearance rate data. In addition to these pieces of data, various pieces of data such as operation data relating to an operation of the user, an item use in the game, and the like are stored.

The game program is a program for executing the game according to the exemplary embodiment. For example, the game program is stored in an external storage medium. If the game is started, the game program is loaded from the external storage medium into the DRAM 85.

The operation data is data regarding an operation transmitted from the controllers (the left controller 3 and the right controller 4) to the main body apparatus 2. The operation data is transmitted from the controllers to the main body apparatus 2 at predetermined time intervals (e.g., $1/200$-second intervals).

The player data includes player character data, owned character data, item object data, and room data.

The player character data is data regarding the player character PC and includes data regarding the shape and the like of the player character PC, data regarding the position and the orientation in the virtual space of the player character PC.

The owned character data is data regarding a character owned by the player character PC and includes data regarding the name, the shape, and the like of each character owned by the player character PC. As described above, if the player character PC defeats a character in a bathe that occurs during the game, the player character PC acquires the character. Hereinafter, a character owned by the player character PC will occasionally be referred to as an "owned character" by being distinguished from a character appearing in the virtual space. A character may be acquired not only in a case where the player character PC succeeds in capturing the character in a battle, but also in a case where another condition holds. For example, if the player character PC wins a battle, a character may be acquired, if the player character PC talks to a character, the character may be acquired. If the player character PC succeeds in a predetermined mission, a character may be acquired. A character may be acquired by consuming in-game currency or real currency.

The item object data is data regarding item objects. The item objects have images representing characters and relate to the characters. The item objects are classified into a plurality of types (e.g., A to E) similarly to the characters. For example, the item object data is acquired when the player character PC is moving along the passage 201.

The room data is data regarding the room 210 created by the player. The room data includes position data indicating a position in the virtual space 200, data regarding an item object placed in the room 210 (data indicating the type of each item object, the name of the item object, the placement position of the item object, and the like).

The other player data is data received from another apparatus and is data regarding another player. The other player data includes room data. The room data in the other player data is data regarding the room 220 created by the other player and includes position data indicating a position in the virtual space 200 and data regarding an item object placed in the room 220 (data indicating the type of each item object, the name of the item object, the placement position of the item object, and the like).

The character data is data regarding a character appearing in the virtual space and includes data regarding the type, the name, the shape, the position, the orientation, and the physical strength value of the character. A character appearing in the virtual space is occasionally referred to as an "appearance character" by being distinguished from a character owned by the player character PC.

The appearance rate data is data regarding the appearance probability of a character, and for example, is data shown in FIGS. 14, 15, 16, and the like.

(Detailed Flow Charts for Game Processing)

Figure 20:
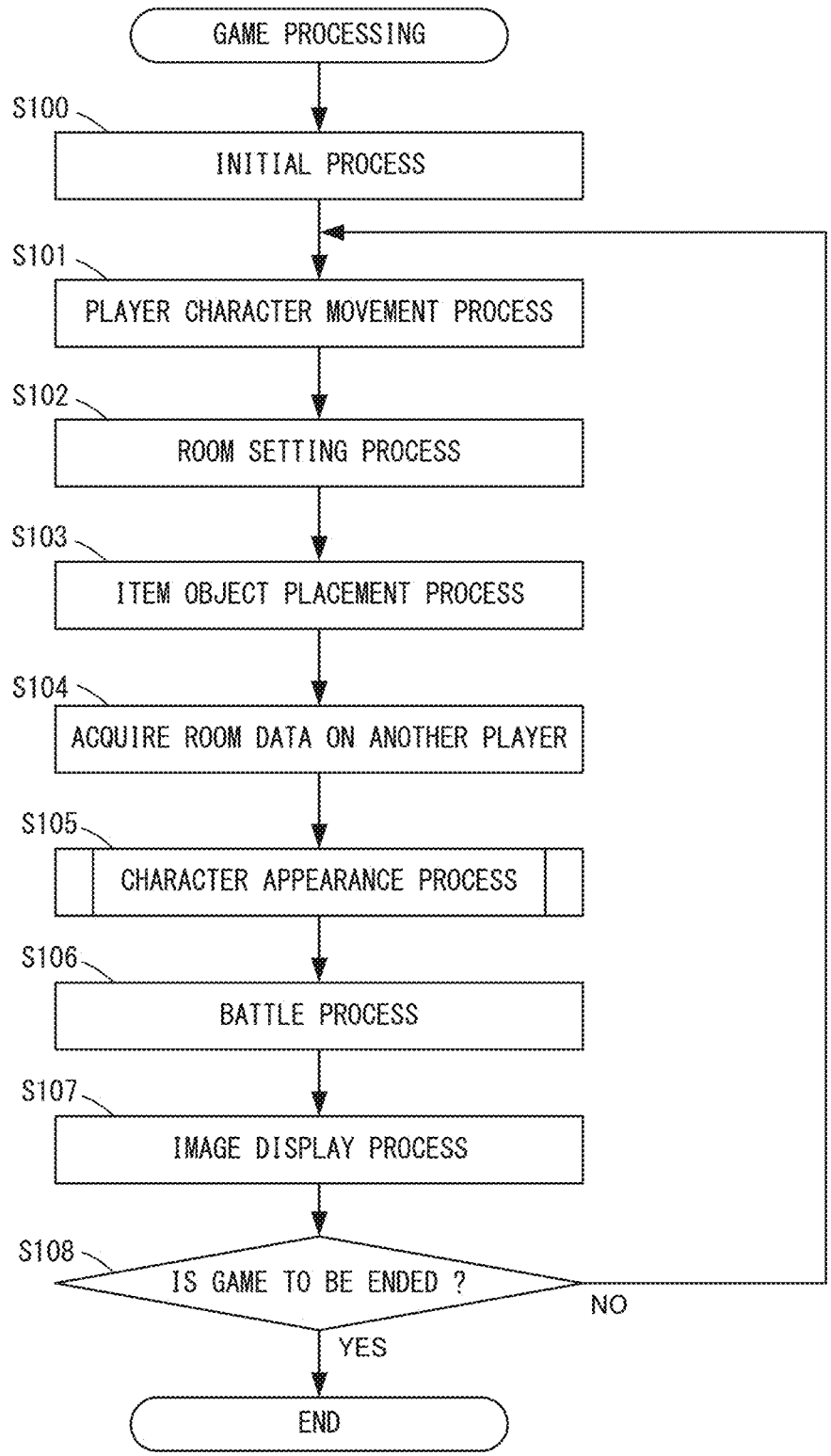
FIG. 20 is an example non-limiting flow chart showing an example of game processing performed by a processor 81 of the main body apparatus 2.

Next, a description is given of the details of the game processing performed by the main body apparatus 2. FIG. 20 is a flow chart showing an example of the game processing performed by the processor 81 of the main body apparatus 2. While the processing shown in FIG. 20 is performed, the controllers transmit the operation data to the main body apparatus 2 at the predetermined time intervals.

As shown in FIG. 20, first, the processor 81 performs an initial process (step S100). In the initial process, the virtual space 200 is set, and the player character PC is placed in the virtual space 200.

After the process of step S100, the processor 81 executes the process of step S101. From this point onward, the processor 81 repeatedly executes the processes of steps S101 to S108 every predetermined frame time (e.g., $1/60$ seconds).

In step S101, the processor 81 performs a movement process on the player character PC. Specifically, based on the latest operation data, the processor 81 determines whether or not an operation input is provided to the analog stick 32. If the operation input is provided, the processor 81 moves the player character PC in the virtual space in accordance with the operation direction of the analog stick 32. For example, if the player character PC is present on the passage 201, the processor 81 moves the player character PC along the passage 201. If the player character PC reaches the vicinity of a room by the movement of the player character PC, the processor 81 causes the player character PC to enter the room. If the player character PC reaches the vicinity of an appearance area, the processor 81 causes the player character PC to enter the appearance area. Next, the processor 81 executes the process of step S102.

In step S102, the processor 81 performs a setting process on the room 210. Specifically, based on the latest operation data, the processor 81 determines whether or not a setting operation for setting the room 210 is performed. In a case where the setting operation is performed, and if the setting condition for the room is satisfied, the processor 81 sets the room 210 at the position where the player character PC is present in the virtual space 200. If the setting operation is not performed, or if the setting condition is not satisfied, or if the room 210 is already set, the processor 81 does not set the room 210, and the processing proceeds to the next step, After step S102, the processor 81 executes the process of step S103.

In step S103, the processor 81 performs a placement process on an item object. This process is executed in a case where the player character PC is present in the room 210 set in step S102. Specifically, based on the operation data, the processor 81 determines whether or not an operation input for placing an item object is provided. If the operation input is provided, the processor 81 places an item object selected in accordance with an operation input at a position in the room 210 specified in accordance with an operation input. For example, as shown in FIG. 13, the processor 81 places the item object IA1 in the region 2119 in accordance with an operation input. If the region 2122 and the item object IB2 are specified, the processor 81 places the item object IB2 in the region 2122 and the region 2123, Next, the processor 81 executes the process of step S104.

In step S104, the processor 81 performs the process of acquiring room data on another player. Specifically, if the processor 81 acquires room data on another player from another apparatus, the processor 81 saves the acquired room data as the other player data in the memory. For example, in a case where an operation for acquiring room data on another player from another apparatus is performed by the player, and if the room data on the other player can be acquired (e.g., if the main body apparatus 2 can communicate with another main body apparatus 2 through local communication), the processor 81 acquires the room data on the other player from the other apparatus. Next, the processor 81 executes the process of step S105.

In step S105, the processor 81 performs a character appearance process. The character appearance process is a process for causing a plurality of characters to appear in an appearance area. The character appearance process is performed, for example, when the player character PC enters an appearance area. In the character appearance process, if a room is not set, or if an item object is not set in a room, characters to appear are determined by a lottery in accordance with a preset probability. If an item object is set in a room, the preset probability is changed. The details of the character appearance process in step S105 will be described below. Next, the processor 81 executes the process of step S106.

In step S106, the processor 81 performs a battle process between the player character PC and a character. The battle process in step S106 is executed in a case where the player character PC comes close to a character appearing in the virtual space (an appearance character). In the battle process, an owned character of the player character PC and an appearance character battle against each other. The owned character and the appearance character attack each other. At this time, the chemistry between the characters differs depending on the characteristics of the characters. For example, the attack of a character having the characteristics of water has a high effect on a character having the characteristics of fire, and the character having the characteristics of fire is greatly damaged. Conversely, the attack of the character having the characteristics of fire has a low effect on the character having the characteristics of water, and damage to the character having the characteristics of water is small. Thus, the player selects the owned character and battles against the appearance character taking into account the chemistry between the owned character and the appearance character. If the player character PC succeeds in capturing the appearance character, the player character PC owns the appearance character. The player character PC itself may battle against the appearance character. Next, the processor 81 executes the process of step S107.

In step S107, the processor 81 performs an image display process. Here, an image based on the result of the processes of the above steps S101 to S106 is generated, and the generated image is output to and displayed on the display device. Next, the processor 81 executes the process of step S108.

In step S108, the processor 81 determines whether or not the game is to be ended. If the player gives an instruction to end the game, the determination is YES in step S108. Then, the processor 81 ends the game processing shown in FIG. 20. If the determination is NO in step S108, the processor 81 executes the process of step S101 again.

(Character Appearance Process)

Figure 21:
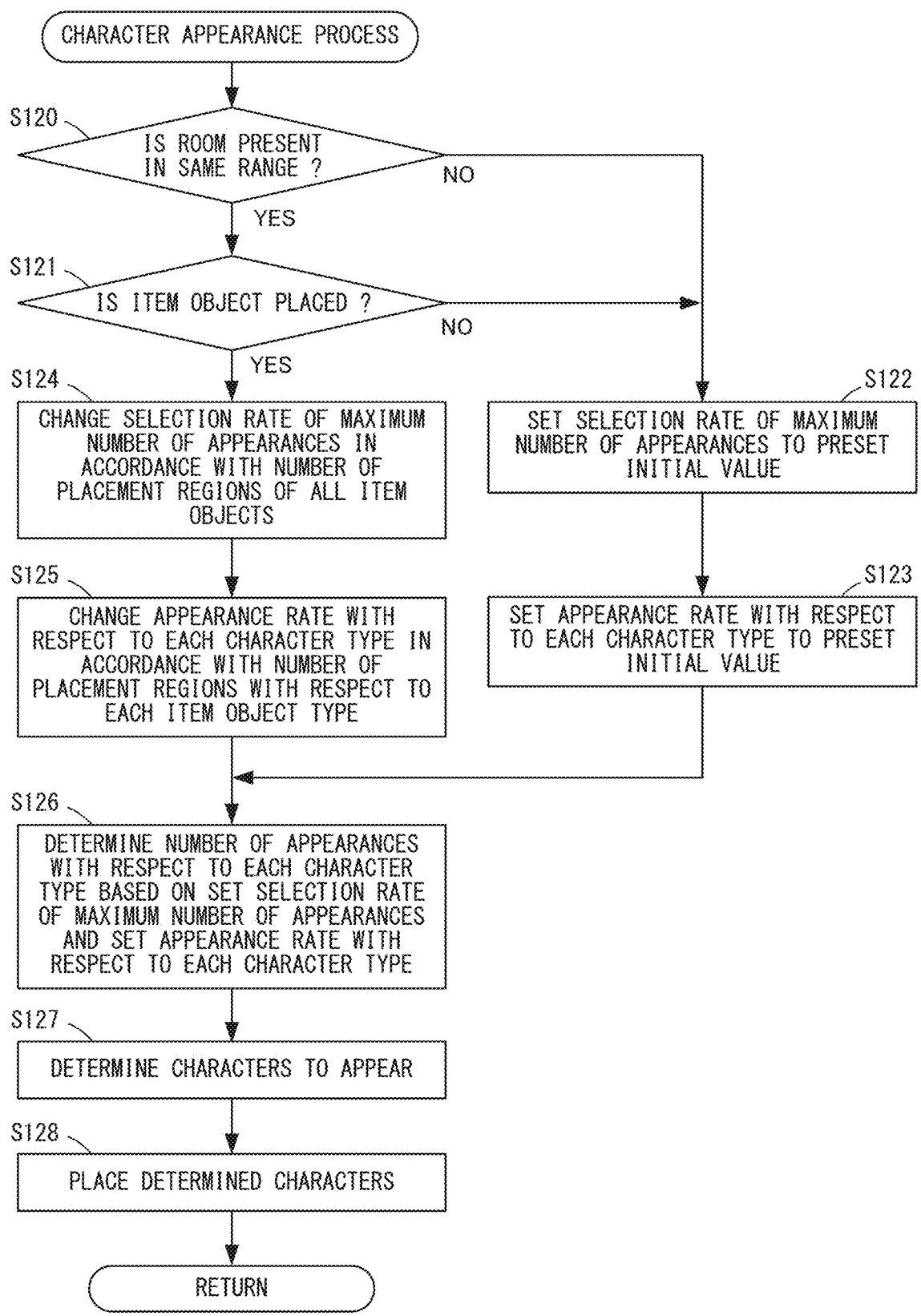
FIG. 21 is an example non-limiting flow chart showing an example of a character appearance process in step S105.

Next, the details of the character appearance process are described. FIG. 21 is a flow chart showing an example of the character appearance process in step S105.

First, in step S120, the processor 81 determines whether or not a room is present in the same range as that of the appearance area where characters are to appear. Specifically, the processor 81 determines whether or not the room 210 set in step S102 or the room 220 set in step S104 is present in a predetermined range in the virtual space 200 relating to the appearance area that the player character PC is going to enter. That is, here, it is determined whether or not the effect of the room 210 created by the player or the room 220 created by the other player reaches the appearance area that the player character PC is going to enter. For example, in FIG. 18, if the player character PC is going to enter the appearance area 202, the room 210 is present in the range X relating to the appearance area 202, and therefore, the determination of the processor 81 is YES in step S120. In FIG. 18, if the player character PC is going to enter the appearance area 203, the room 220 is present in the range Y relating to the appearance area 203, and therefore, the determination of the processor 81 is YES in step S120. On the other hand, in FIG. 18, if the player character PC is going to enter the appearance area 204, a room is not present in the range Z relating to the appearance area 204, and therefore, the determination of the processor 81 is NO in step S120.

If it is determined that a room is present (step S120: YES), next, the processor 81 executes the process of step S121. If, on the other hand, it is determined that a room is not present (step S120: NO), next, the processor 81 executes the process of step S122.

In step S121, the processor 81 determines whether or not an item object is set in the room. Here, if an item object is set in the room in the range relating to the appearance area (the room 210 or the room 220), the determination of the processor 81 is YES.

If the determination is NO in step S121, next, the processor 81 executes the process of step S122. If, on the other hand, the determination is YES in step S121, next, the processor 81 executes the process of step S124.

In step S122, the processor 81 sets the selection rate of the maximum number of appearances of characters to a preset initial value. Here, a room is not present in the range relating to the appearance area, or even if a room is present, an item object is not set, and therefore, the processor 81 sets a preset probability as the selection rate of the maximum number of appearances. Next, the processor 81 executes the process of step S123.

In step S123, the processor 81 sets the appearance rate with respect to each character type to a preset initial value. Here, for example, the appearance rates of the respective types are uniformly set to 20%. The initial value of the appearance rate with respect to each type may differ in accordance with the appearance area. Next, the processor 81 executes the process of step S126.

If on the other hand, at least one room relating to the appearance area is present and at least one item object is placed in the room (step S121: YES), the process of step S124 is performed.

In step S124, the processor 81 changes the selection rate of the maximum number of appearances of characters from the initial value in accordance with the number of placement regions of all the item objects placed in the room and sets the changed selection rate of the maximum number of appearances in the memory. Here, if the room 210 is present in the range relating to the appearance area, the selection rate of the maximum number of appearances is changed in accordance with the number of placement regions of all the item objects placed in the room 210. If the room 220 created by the other player is present in the range relating to the appearance area, the selection rate of the maximum number of appearances is changed in accordance with the number of placement regions of all the item objects placed in the room 220. If both the rooms 210 and 220 are present in the range relating to the appearance area, the increase amount of the selection rate of the maximum number of appearances may be obtained based on the number of placement regions of all the item objects in these rooms. The increase amount based on each of the rooms may be calculated, and based on the calculated increase amount of each of the rooms, an increase amount obtained by combining the plurality of rooms may be obtained. Next, the processor 81 executes the process of step S125.

In step S125, the processor 81 changes the appearance rate with respect to each character type from the initial value in accordance with the number of placement regions with respect to each item object type and sets the changed appearance rate with respect to each character type in the memory. Here, if the room 210 is present in the range relating to the appearance area, the increase/decrease amount of the appearance rate with respect to each character type is calculated in accordance with the number of placement regions with respect to each type of an item object placed in the room 210. For example, if item objects of the type A and the type B are placed in the room 210, the processor 81 calculates the increase/decrease amount of the appearance rate with respect to each character type in accordance with the number of placement regions of the item object of the type A using FIG. 15, and also calculates the increase/decrease amount of the appearance rate with respect to each character type in accordance with the number of placement regions of the item object of the type B using FIG. 16. If the room 220 is present in the range relating to the appearance area, the increase/decrease amount of the appearance rate with respect to each character type is calculated in accordance with the number of placement regions with respect to each type of an item object placed in the room 220. If both the rooms 210 and 220 are present in the range relating to the appearance area, the increase/decrease amounts of the appearance rates of characters of the respective types are calculated by combining the influences of the rooms. For example, the increase/decrease amounts of the appearance rates of characters of the respective types calculated based on the room 210 and the increase/decrease amounts of the appearance rates of characters of the respective types calculated based on the room 220 may be added together. Alternatively, a comprehensive effect (the increase/decrease amount of the appearance rate with respect to each type) based on the plurality of rooms may be calculated by another method. Next, the processor 81 executes the process of step S126.

In step S126, the processor 81 determines the number of appearances with respect to each character type based on the set selection rate of the maximum number of appearances and the set appearance rate with respect to each character type. Specifically, based on the selection rate of the maximum number of appearances, the processor 81 calculates the total number of characters to appear, and further, based on the calculated total number of characters and the calculated appearance rate with respect to each character type, calculates the number of appearances with respect to each character type. Here, if a room is not present, or if an item object is not set in a room, a lottery is held based on the selection rate of the maximum number of appearances and the appearance rate with respect to each character type that are set in steps S122 and S123. If an item object is placed in the room, a lottery is held based on the selection rate of the maximum number of appearances and the appearance rate with respect to each character type that are set in steps S124 and S125, Next, the processor 81 executes the process of step S127.

In step S127, the processor 81 determines characters to appear. Here, the processor 81 determines individual characters to appear in accordance with FIG. 10. The processor 81 determines individual characters among the respective types to match the number of appearances with respect to each character type determined in step S126. Next, the processor 81 executes the process of step S128.

In step S128, the processor 81 places the determined characters. Specifically, the processor 81 places the plurality of determined characters in the appearance area that the player character PC is going to enter. Then, the processor 81 ends the process shown in FIG. 21.

The above flow charts are mere illustrative, and therefore, the contents of the steps may be changed, or another step may be added, or some of the above steps may be omitted, or the order of the steps may be switched.

As described above, in the exemplary embodiment, on the premise that a plurality of characters different from a player character are caused to appear in a virtual space based on a preset appearance probability, a predetermined item object is placed based on an operation input provided by a player, and the appearance probability is changed based on the type of the placed item object. Then, based on the changed appearance probability, the plurality of characters are caused to appear.

As described above, in the exemplary embodiment, the predetermined item object is placed in a room, whereby it is possible to change the appearance probability of a character. The appearance probability of a character of a type relating to the type of the placed item object is increased. Consequently, for example, the player can place an item object so that a desired character is likely to appear. The appearance probability of a character is changed in accordance with the type of the placed item object, and therefore, the player selects and places an item object. Thus, it is possible to improve the interest of the game.

In the exemplary embodiment, the larger the region occupied by a placed item object is, the more likely the number of appearances of characters is great. In other words, the greater the number of placed item objects is, the greater the number of appearances of characters is. Thus, the player places more item objects and thereby can cause more characters to appear.

In the exemplary embodiment, the larger the region occupied by a placed item object is, the higher the appearance rate of a character of a type relating to the type of the item object is. Thus, by placing more item objects of a particular type, it is possible to make a character of the particular type likely to appear.

In the exemplary embodiment, the player generates a room at a desired position in the virtual space and places an item object in the room. Thus, it is possible to improve the interest of a game compared to a case where the appearance probability of a character is changed by merely acquiring an item object.

Variations

While image processing according to the exemplary embodiment has been described above, the exemplary embodiment is merely an example and may be modified as follows, for example.

For example, in the above exemplary embodiment, based on the size of a region occupied by a placed item object, the total number of characters to appear (the number of appearances of characters) is made likely to increase, and the appearance probability with respect to each character type is also changed. That is, in accordance with the size of a region occupied by an item object, the lottery probability regarding the number of appearances of characters is changed so that the number of appearances is likely to increase, and the appearance probability with respect to each character type is also changed. In another exemplary embodiment, in accordance with the size of a region occupied by an item object, only the lottery probability regarding the number of appearances of characters or the number of appearances of characters may be increased, and the appearance probability with respect to each character type may be fixed. The total number of characters to appear is increased, whereby characters of all the types are likely to appear. In accordance with the size of a region occupied by an item object, the number of appearances of characters may not be changed, and only the appearance probability with respect to each character type may be changed.

In the above exemplary embodiment, a plurality of characters determined by a lottery are placed so that the player can view the plurality of characters in an appearance area. Specifically, in the above exemplary embodiment, the player views a character appearing in the virtual space, brings the player character PC close to the character, and causes the player character PC to battle against the character. That is, in the above exemplary embodiment, the character is caused to appear on the premise of a symbol encounter. In another exemplary embodiment, the player may not be able to recognize the character until the battle is started. For example, when the player character PC is moving in the virtual space, the character may not be displayed so that it is impossible or difficult for the player to recognize the character until the battle is started. Then, at a random timing during the movement of the player character PC, the character may appear, and the battle against the character may be started.

Specifically, in this case, in the normal state, an appearance process (a random encounter process) for, in accordance with the movement of the player character PC, causing at least any one of a plurality of characters to appear based on a preset appearance probability is performed. If the character appears, a battle is held. In a case where the room 210 or the room 220 influences the virtual space, and if an item object is placed in the room 210 or the room 220, the appearance probability in the random encounter process may be changed based on the type of the placed item object.

When the player character PC is moving in the virtual space, a suggestive image suggesting that some character is present at a certain position although it is difficult to recognize the type or the name of the character may be displayed. For example, as such a suggestive image, the shadow of the character may be displayed. Then, if the player character PC comes close to the position of the suggestive image, a battle against the character relating to the suggestive image may be started. In this case, when the battle is started, a lottery for selecting any of a plurality of characters may be held, and the character selected by the lottery may appear. Alternatively, a character may be selected by a lottery before the above suggestive image is displayed, and when a battle is started, the character may be caused to appear. Also in such a case, in the above lottery, in the normal state, a character is selected based on a preset appearance probability and caused to appear. If an item object is placed in the room 210 or the room 220, the appearance probability may be changed in accordance with the type of the placed item object.

In the above exemplary embodiment, the total number of characters to appear is determined by a lottery, and based on the determined total number, a lottery regarding a character type (a type lottery) is held, thereby determining the number of appearances with respect to each character type. Then, a lottery regarding an individual character (an individual lottery) is held, thereby determining characters to actually appear. Then, in accordance with the size of a region occupied by an item object, a probability in each lottery is changed. In another exemplary embodiment, the above type lottery may not be held, and an individual lottery based on an appearance rate set with respect to each character may be held, thereby determining characters to appear. In this case, in accordance with the size of a region occupied by an item object, a probability in the individual lottery is changed. For example, the appearance rate in the individual lottery of a character relating to the placed item object may be increased. The appearance rates of all characters of the same type as the placed item object may be increased. As described above, if an item object is placed in a room, a method for determining characters to appear may be any method so long as a probability is changed so that a character of a type relating to the type of the item object is likely to appear.

In the above exemplary embodiment, in accordance with the number of placement regions of an item object placed in a room, the appearance probability of a character is changed. In another exemplary embodiment, in addition to the number of placement regions of an item object, based on the position in the room or the placement pattern of the item object, the appearance probability of a character may be changed. In accordance with the combination of a plurality of item objects placed in a room, the appearance probability of a character may be changed.

In the above exemplary embodiment, an item object is placed in a room set by the player or another player, whereby the appearance probability of a character is changed. In another exemplary embodiment, the location where an item object is placed may not be limited to a room set by the player or another player. For example, based on an operation input provided by the player or another player, an item object may be placed in a passage or an appearance area in the virtual space. Based on an operation input provided by the player or another player, an item object may be placed in a virtual space different from the virtual space where the game is currently performed. Then, based on the item object placed by the player or the other player, the appearance probability of a character is changed.

The above game is mere an example. The above process of causing a character to appear may be performed in any other game, and the appearance probability of the character may be changed.

In the above exemplary embodiment, the above processing is performed by the main body apparatus 2 in the game system 1, Alternatively, the above processing may be executed by any other information processing apparatus (e.g., a personal computer, a smartphone, a tablet terminal, or a server) or the like. The above processing may be performed by an information processing system including a plurality of apparatuses, and a part or all of the above processing may be performed by any of the plurality of apparatuses.

While the exemplary embodiment has been described, the above description is merely illustrative, and the exemplary embodiment may be improved and modified in various manners.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program causing a computer of an information processing apparatus to provide execution comprising:
performing an appearance process for causing at least any one of a plurality of characters different from a player character to appear based on a preset appearance probability in a virtual space;
placing an item object based on an operation input; and
changing the appearance probability in the appearance process based on a type of the placed item object and an appearance area associated with a location in the virtual space.

2. A non-transitory computer-readable storage medium having stored therein a game program causing a computer of an information processing apparatus to provide execution comprising:
moving a player character based on an operation input in a virtual space;
in accordance with the movement of the player character, performing an appearance process for causing at least any one of a plurality of characters different from the player character to appear based on a preset appearance probability in a virtual space;
placing an item object based on an operation input; and
changing the appearance probability in the appearance process based on a type of the placed item object and an appearance area associated with a location in the virtual space.

3. The non-transitory computer-readable storage medium having stored therein the game program according to claim 1, wherein
the item objects are classified into a plurality of types,
the plurality of characters are classified into a plurality of types, and
the game program further causes the computer to provide execution comprising:
placing the item object of any type of the item objects of the plurality of types based on the operation input; and
changing the appearance probability so that any of the plurality of characters of a type relating to the type of the placed item object is likely to appear.

4. The non-transitory computer-readable storage medium having stored therein the game program according to claim 1, wherein the game program further causes the computer to provide execution comprising placing the item object at a position specified in the virtual space based on the operation input.

5. The non-transitory computer-readable storage medium having stored therein the game program according to claim 4, wherein the game program further causes the computer to provide execution comprising:
generating a room that can be entered from a position specified in the virtual space based on the operation input; and
placing the item object at a position specified in the room based on the operation input.

6. The non-transitory computer-readable storage medium having stored therein the game program according to claim 5, wherein the item object has a size, and a plurality of the item objects can be placed in the room, and the game program further causes the computer to provide execution comprising changing the appearance probability in accordance with a size of a region where the item object is placed in the room.

7. The non-transitory computer-readable storage medium having stored therein the game program according to claim 5, wherein the game program further causes the computer to provide execution comprising changing the appearance probability in the appearance process in a range in the virtual space including the position from which the room can be entered.

8. The non-transitory computer-readable storage medium having stored therein the game program according to claim 4, wherein the game program further causes the computer to provide execution comprising:
communicating with another information processing apparatus;
acquiring information regarding the item object placed by another player; and
changing the appearance probability further based on the information regarding the item object placed by the other player.

9. An information processing apparatus, comprising:
processing circuitry including at least one processor; and
a display, wherein the processing circuitry is configured to:
perform an appearance process for causing at least any one of a plurality of characters different from a player character to appear based on a preset appearance probability in a virtual space;
place an item object based on an operation input; and
change the appearance probability in the appearance process based on a type of the placed item object and an appearance area associated with a location in the virtual space.

10. An information processing apparatus, comprising:
processing circuitry including at least one processor; and
a display, wherein the processing circuitry is configured to:
move a player character based on an operation input in a virtual space;
in accordance with the movement of the player character, perform an appearance process for causing at least any one of a plurality of characters different from the player character to appear based on a preset appearance probability in a virtual space;
place an item object based on an operation input; and
change the appearance probability in the appearance process based on a type of the placed item object and an appearance area associated with a location in the virtual space.

11. The information processing apparatus according to claim 9, wherein
the item objects are classified into a plurality of types,
the plurality of characters are classified into a plurality of types, and
the processing circuitry is further configured to:
place the item object of any type of the item objects of the plurality of types based on the operation input; and
change the appearance probability so that any of the plurality of characters of a type relating to the type of the placed item object is likely to appear.

12. The information processing apparatus according to claim 9, wherein the processing circuitry is further configured to place the item object at a position specified in the virtual space based on the operation input.

13. The information processing apparatus according to claim 12, wherein the processing circuitry is further configured to:

generate a room that can be entered from a position specified in the virtual space based on the operation input; and place the item object at a position specified in the room based on the operation input.

14. The information processing apparatus according to claim 13, wherein the item object has a size, and a plurality of the item objects can be placed in the room, and the processing circuitry is further configured to change the appearance probability in accordance with a size of a region where the item object is placed in the room.

15. The information processing apparatus according to claim 13, wherein the processing circuitry is further configured to change the appearance probability in the appearance process in a range in the virtual space including the position from which the room can be entered.

16. The information processing apparatus according to claim 12, wherein the processing circuitry is further configured to:

communicate with another information processing apparatus;

acquire information regarding the item object placed by another player; and change the appearance probability further based on the information regarding the item object placed by the other player.

17. An information processing system, comprising:

at least one processor; and at least one memory configured to store computer readable instructions that, when executed by the at least one processor, cause the information processing system to:

perform an appearance process for causing at least any one of a plurality of characters different from a player character to appear based on a preset appearance probability in a virtual space;

place an item object based on an operation input; and change the appearance probability in the appearance process based on a type of the placed item object and an appearance area associated with a location in the virtual space.

18. An information processing system, comprising:

at least one processor; and at least one memory configured to store computer readable instructions that, when executed by the at least one processor, cause the information processing system to:

move a player character based on an operation input in a virtual space;

in accordance with the movement of the player character, perform an appearance process for causing at least any one of a plurality of characters different from the player character to appear based on a preset appearance probability in a virtual space;

place an item object based on an operation input; and change the appearance probability in the appearance process based on a type of the placed item object and an appearance area associated with a location in the virtual space.

19. The information processing system according to claim 17, wherein the item objects are classified into a plurality of types, the plurality of characters are classified into a plurality of types, and the information processing system is further caused to:

place the item object of any type of the item objects of the plurality of types based on the operation input; and change the appearance probability so that any of the plurality of characters of a type relating to the type of the placed item object is likely to appear.

20. The information processing system according to claim 17, wherein the information processing system is further caused to place the item object at a position specified in the virtual space based on the operation input.

21. The information processing system according to claim 20, wherein the information processing system is further caused to:

generate a room that can be entered from a position specified in the virtual space based on the operation input; and place the item object at a position specified in the room based on the operation input.

22. The information processing system according to claim 21, wherein the item object has a size, and a plurality of the item objects can be placed in the room, and the information processing system is further caused to change the appearance probability in accordance with a size of a region where the item object is placed in the room.

23. The information processing system according to claim 21, wherein the information processing system is further caused to change the appearance probability in the appearance process in a range in the virtual space including the position from which the room can be entered.

24. The information processing system according to claim 20, wherein the information processing system is further caused to:

communicate with another information processing apparatus;

acquire information regarding the item object placed by another player; and change the appearance probability further based on the information regarding the item object placed by the other player.

25. An information processing method performed by an information processing system, the information processing method comprising:

performing an appearance process for causing at least any one of a plurality of characters different from a player character to appear based on a preset appearance probability in a virtual space;

placing an item object based on an operation input; and changing the appearance probability in the appearance process based on a type of the placed item object and an appearance area associated with a location in the virtual space.

26. An information processing method performed by an information processing system, the information processing method comprising:

moving a player character based on an operation input in a virtual space;

in accordance with the movement of the player character, performing an appearance process for causing at least any one of a plurality of characters different from the player character to appear based on a preset appearance probability in a virtual space;

placing an item object based on an operation input; and changing the appearance probability in the appearance process based on a type of the placed item object and an appearance area associated with a location in the virtual space.

27. The information processing method according to according to claim 25, wherein the item objects are classified into a plurality of types, and the plurality of characters are classified into a plurality of types, the information processing method further comprising:

placing the item object of any type of the item objects of the plurality of types based on the operation input; and changing the appearance probability so that any of the plurality of characters of a type relating to the type of the placed item object is likely to appear.

28. The information processing method according to claim 25, further comprising placing the item object at a position specified in the virtual space based on the operation input.

29. The information processing method according to according to claim 28, further comprising:

generating a room that can be entered from a position specified in the virtual space based on the operation input; and placing the item object at a position specified in the room based on the operation input.

30. The information processing method according to according to claim 29, wherein the item object has a size, and a plurality of the item objects can be placed in the room, and the information processing method further comprises changing the appearance probability in accordance with a size of a region where the item object is placed in the room.

31. The information processing method according to according to claim 29, further comprising changing the appearance probability in the appearance process in a range in the virtual space including the position from which the room can be entered.

32. The information processing method according to according to claim 28, further comprising:

communicating with another information processing apparatus;

acquiring information regarding the item object placed by another player; and changing the appearance probability further based on the information regarding the item object placed by the other player.

* * * * *